United States Patent
Imanishi et al.

(10) Patent No.: US 6,767,434 B1
(45) Date of Patent: Jul. 27, 2004

(54) METHOD OF TREATING SUBSTANCE AND APPARATUS FOR CARRYING OUT THE SAME

(75) Inventors: Yuichiro Imanishi, Nagoya (JP); Naohiro Shimizu, Nagoya (JP); Shozo Ishii, 1-1-2, Asada, Asada, Kawasaki-Ku, Kawasaki City, Kanagawa Pref. (JP)

(73) Assignees: NGK Insulators, Ltd., Nagoya (JP); Shozo Ishii, Kawasaki (JP)

( * ) Notice: Subject to any disclaimer, the term of this patent is extended or adjusted under 35 U.S.C. 154(b) by 366 days.

(21) Appl. No.: 09/669,815

(22) Filed: Sep. 26, 2000

(30) Foreign Application Priority Data

Sep. 27, 1999  (JP) .......................................... 11-272603

(51) Int. Cl.[7] ............................................... B01J 19/08
(52) U.S. Cl. ........................ 204/164; 204/174; 204/177
(58) Field of Search ................................. 204/164, 174, 204/177

(56) References Cited

U.S. PATENT DOCUMENTS

| | | | |
|---|---|---|---|
| 4,665,476 A | * | 5/1987 | Masuda ........................ 363/86 |
| 5,609,736 A | | 3/1997 | Yamamoto |
| 5,695,619 A | * | 12/1997 | Williamson et al. ........ 204/177 |
| 5,804,149 A | | 9/1998 | Ota et al. |
| 5,843,288 A | | 12/1998 | Yamamoto |
| 5,914,015 A | | 6/1999 | Barlow et al. |
| 6,027,617 A | | 2/2000 | Hayashi et al. |
| 6,517,786 B1 | * | 2/2003 | Best et al. .................. 204/164 |

FOREIGN PATENT DOCUMENTS

| | | |
|---|---|---|
| DE | 19735362 A1 | 2/1998 |
| WO | 99 43419 A | 9/1999 |

* cited by examiner

Primary Examiner—Kishor Mayekar
(74) Attorney, Agent, or Firm—Burr & Brown

(57) ABSTRACT

An apparatus for treating harmful substances contained in a waste gas discharged from waste burning pants includes an insulating honeycomb structural body made of ceramics containing a photocatalytic material, a number of through holes formed in the honeycomb structural body in parallel with each other, first and second mesh electrodes arranged on respective end surfaces of the honeycomb structural body, and a pulse supply source connected across the first and second mesh electrodes. A waste gas flows through the through holes formed in the honeycomb structural body, while pulse corona discharge plasma is uniformly generated along the through holes. Harmful substances contained in the waste gas are decomposed by the high energy electrons and radicals generated by the discharge plasma, and the photocatalytic material is excited by ultraviolet radiation emitted from the discharge plasma to produce active oxygen which decomposes and/or oxidizes the harmful substances.

11 Claims, 22 Drawing Sheets

Waste Gas →

Waste Gas →

METHOD OF TREATING SUBSTANCE AND APPARATUS FOR CARRYING OUT THE SAME

BACKGROUND OF THE INVENTION

1. Field of the Invention

The present invention relates to a method of treating substances by applying discharge plasma to a fluid containing the substances to be treated. The present invention also relates to an apparatus for carrying out such a substance treating method. Particularly, the present invention relates to a technique for decomposing, by discharge plasma, harmful or poisonous substances such as dioxins contained in waste gases emitted from burning systems into harmless substances or easily collectable substances.

2. Description of the Related Art

Various kinds of harmful substances are contained in waste gases discharged from city type incinerators and large scale industrial waste treating plants. Recently, not only NOx and SOx, but also dioxins have been classified as harmful substances. It is important to emit the waste gas into the atmosphere only after reducing the concentrations of these harmful substances below the allowable safety level.

Heretofore, many treating methods have been developed for reducing concentrations of harmful substances in waste gases. However, in the known methods, large scale treating equipment is required, a treating efficiency is relatively low, running costs are rather high, and maintenance is complicated. Therefore, the known treating methods could not be effectively used. For instance, in many burning systems, electric precipitation devices are used. However, it has been made clear that the electric precipitation itself might be a source generating harmful dioxins. Therefore, a bag filter has been utilized instead of the electric precipitation device. However, the bag filter has a short life time and its maintenance is rather complicated.

In order to remove or mitigate the above-mentioned demerits, there has been proposed a substance treating method in which harmful substances are reacted with electrons generated by corona discharge or dielectric barrier discharge and are transformed or converted into harmless substances or substances that could be collected easily. FIG. 1 shows a known waste gas treating apparatus. An electrically conductive pipe 1 serving as a coaxial tubular reaction vessel is provided, a wire electrode 2 is arranged along a longitudinal axis of the pipe 1 and a pulse supply source 3 is connected across the pipe and the wire electrode to generate corona discharge within the pipe. Then, a waste gas is flowed through the pipe 1 and dioxins, $NO_x$ and $SO_x$ are reacted with radicals and accelerated electrons generated by the corona discharge and are decomposed into harmless substances.

FIG. 2 shows another known waste gas treating apparatus using the above-mentioned pulse discharge plasma. In this apparatus, an inner pipe 4 made of a dielectric material is arranged on an inner wall of an electrically conductive outer pipe 1 and a wire electrode 2 is arranged within the inner pipe 4 along its longitudinal axis. In this apparatus, an AC voltage supply source 5 is connected across the electrically conductive outer pipe 1 and the wire electrode 2 to generate the barrier discharge.

FIG. 3 is a perspective view depicting another known waste gas treating apparatus disclosed in Japanese Institute of Electrical Engineers Theses, Hiroyuki YASUI, "Waste Gas Treating Technique with Pulse Corona Discharge," Vol. 119, No. 5, 1997. A plurality of plate electrodes 6 are arranged in parallel with each other, wire electrodes 7 are arranged between adjacent plate electrodes, and a pulse supply source 3 is connected across the plate electrodes 6 and the wire electrodes 7. A waste gas containing substances to be treated is flowed through spaces between successive plate electrodes 6.

In the known substance treating method using the discharge plasma, the wire electrode is arranged along the longitudinal axis of a gas flow passage having a relatively large cross sectional area, and therefore, the discharge plasma could not be generated uniformly along the space through which the waste gas flows. For instance, in the known apparatus shown in FIG. 1, the discharge plasma is locally produced around the wire electrode 2 as depicted in FIGS. 4 and 5, and the plasma is scarcely generated near the periphery of the gas flow passage. When the discharge plasma is localized, a possibility of the reaction of given substances contained in the waste gas with electrons generated by the plasma might be decreased, and the treating efficiency becomes low. This problem also occurs in the known apparatus shown in FIG. 3 using the plate electrodes 6 and wire electrodes 7.

In the above explained known substance treating apparatuses, the pulse supply source or AC voltage supply source is connected across the two kinds of electrodes. In order to decompose dioxins contained in a waste gas, dioxins have to be reacted with electrons having substantially high energy. However, the known waste gas treating apparatuses could not efficiently generate electrons having high energy. That is to say, although an ordinary AC voltage supply source is connected across the electrodes, it is impossible to generate efficiently electrons having desired high energy.

When the AC voltage supply source is utilized, electrons having energy of about 1 eV are predominantly generated as shown by a curve A (HF plasma) in FIG. 6, but a density of electrons having energy higher than 5 eV becomes very low. In order to decompose dioxins efficiently, electrons having energy of about 3–10 eV are effective, but a density of such high energy electrons is low. Therefore, the known apparatus using the high frequency voltage supply source could not decompose dioxins efficiently.

Moreover, in case of using the pulse supply source, in order to decompose dioxins efficiently, it is necessary to generate electrons having energy of about 3–10 eV. To this end, a voltage pulse applied across the discharge electrodes must have a sharp or steep raising edge as well as a short pulse duration. To this end, one may consider to utilize a pulse supply source including a thyratron as an active element. The pulse supply source using the thyratron has sharp raising edge, short pulse duration and large discharge current as shown in FIG. 7. However, the thyratron has several drawbacks such as large size, low power efficiency, high cost, short life time, large secular variation and cumbersome maintenance. Particularly, in the waste treating system, the power consumption is liable to be large due to the cathode heater and the cost for exchanging the thyratron having a short life time becomes high.

In order to overcome the above mentioned problems, it is desired to utilize a pulse supply source having a semiconductor element as a switching element, because the semiconductor element has a high power efficiency and a very long life time. As the semiconductor switching element, use may be made of a GTO (Gate Turn-off Thyristor) and an IGBT (Insulated Gate Bipolar Transistor). However, a GTO has a very slow raising edge and a long duration as illustrated in FIG. 8. Furthermore, electrons having a desired energy level could not be generated efficiently unless a plurality of large scale circuits including magnetic compression circuits are connected in cascade. Although an IGBT can generates a pulse having a steeper raising edge and a shorter duration than a GTO, as shown in FIG. 9, its raising edge is not sufficiently sharp to generate electrons having high energy of about 3–10 eV with a high density, such electrons being necessary for decomposing dioxins in an efficient manner.

There has been also proposed to treat harmful substances contained in waste gases using materials having catalysis. However, the treating efficiency is not sufficiently high, and waste gases emitted from city type incinerators and industrial waste treating plants could not be purged effectively, because such waste gases contain harmful substances with very high densities.

Recently it has been proposed to treat harmful substances using materials such as $TiO_2$ having photocatalysis. However, this type photocatalysis needs to be excited with ultraviolet radiation, and therefore it is limited to outdoor applications such as load fences, load surfaces and outer walls of buildings. Therefore, photocatalysis could be not be utilized for purging waste gases emitted from city type incinerators and industrial waste treating plants.

SUMMARY OF THE INVENTION

The object of the present invention is to provide a novel and useful method of treating substances, in which the substances can be treated efficiently by a combination of catalysis and discharge plasma generated uniformly along a long passage through which a fluid containing the substances to be treated flows.

It is another object of the invention to provide a method of treating substances, in which the substances can be treated efficiently with a pulse discharge plasma which can generate electrons having a desired high energy level with a high density.

It is another object of the invention to provide a method of treating substances, in which the above mentioned pulse discharge plasma generating electrons having a high energy level can be effectively produced by a semiconductor switching element.

It is still another object of the invention to provide a method of treating substances, in which a treating efficiency can be improved by exciting a photocatalysis material with ultraviolet radiation emitted from the discharge plasma.

According to the present invention, a method of treating substances comprises the steps of:

generating discharge plasma within an electrically insulating honeycomb structural body having a plurality of through holes by applying a discharge voltage across electrodes, at least a part of the electrodes being made of a metal having catalysis;

flowing a fluid containing substances to be treated through the plurality of through holes formed in the honeycomb structural body; and treating the substances contained in the fluid by a reaction with the discharge plasma and by catalysis of at least a part of the electrodes.

According to further aspect of the invention, a method of treating substances comprises the steps of:

generating discharge plasma within an electrically insulating honeycomb structural body having a plurality of through holes by applying a discharge voltage across electrodes, at least a part of the honeycomb structural body being made of a material having photocatalysis;

flowing a fluid containing substances to be treated through the plurality of through holes formed in the honeycomb structural body; and treating the substances contained in the fluid by a reaction with the discharge plasma and by decomposition and/or oxidation by active oxygen generated by the photocatalysis material excited with radiation emitted from the discharge plasma.

According to further aspect of the invention, a method of treating substances comprises the steps of:

generating discharge plasma within an electrically insulating honeycomb structural body having a plurality of through holes by applying a discharge voltage across electrodes, at least a part of the honeycomb structural body being made of a photocatalysis material and at least a part of the electrodes being made of a metal having catalysis;

flowing a fluid containing substances to be treated through the plurality of through holes formed in the honeycomb structural body; and treating the substances contained in the fluid by a reaction with the discharge plasma, by catalysis of at least a part of the electrodes and by active oxygen generated by the photocatalysis material excited with radiation emitted from the discharge plasma.

The present invention also relates to an apparatus for treating substances, and has for its object to provide a substance treating apparatus which can treat particular substances efficiently, while the apparatus can be small in size, can save power, can have a long life time, and is less expensive in cost.

According to the present invention, an apparatus for treating substances comprises:

an electrically insulating honeycomb structural body having a plurality of parallel through holes through which a fluid containing substances to be treated flows;

an electrode system for generating discharge plasma within the honeycomb structural body such that the substances contained in the fluid flowing through the through holes is reacted with the discharge plasma, at least a part of the electrode system being made of a material having catalysis; and a power supply source connected to the electrode system for applying a discharge voltage to the electrode system such that the discharge plasma is generated within the through holes of the honeycomb structural body.

According to further aspect of the invention, an apparatus for treating substances comprises:

a honeycomb structural body having a plurality of parallel through holes through which a fluid containing substances to be treated flows, at least a part of the honeycomb structural body being made of ceramics including a material having photocatalysis;

an electrode system for generating discharge plasma within the honeycomb structural body such that the substances contained in the fluid flowing through the through holes are reacted with the discharge plasma and the material having photocatalysis is excited with radiation emitted from the discharge plasma; and a voltage supply source connected to the electrode system for applying a discharge voltage to the electrode system such that the discharge plasma is generated within the through holes of the honeycomb structural body.

According to further aspect of the invention, an apparatus for treating substances comprises:

an electrically insulating honeycomb structural body having a plurality of parallel through holes through which a fluid containing substances to be treated flows, at least a part of the honeycomb structural body being made of a material having photocatalysis;

an electrode system for generating discharge plasma within the honeycomb structural body such that the substances contained in the fluid flowing through the through holes is reacted with the discharge plasma and the material having photocatalysis is excited with radiation emitted from the discharge plasma, at least a part of the electrode system being made of a material having catalysis; and a power supply source connected to the electrode system for applying a discharge voltage to the electrode system such that the discharge plasma is generated within the through holes of the honeycomb structural body.

In the method and apparatus for treating a substance according to the present invention, gas or liquid, i.e. fluid containing substances to be treated flows though the through holes formed in the honeycomb structural body and the discharge plasma is generated within the through holes. Since the discharge space is defined by the through holes, the discharge plasma is generated uniformly over the whole cross-sectional area of the fluid passages, and thus the substances can be efficiently reacted with radicals and electrons generated by the discharge plasma. In this manner, the substance treating efficiency can be increased.

Furthermore, when at least a part of the electrode system for generating the discharge plasma is made of a catalysis metal such as platinum, palladium and nickel series metals, the substances to be treated can be decomposed by the reaction with electrons having a lower energy level under the catalysis. In this manner, the treating efficiency can be further improved materially.

Moreover, when at least a part of the honeycomb structural body is made of a photocatalysis material, the photocatalysis material can be effectively excited with ultraviolet radiation emitted from the discharge plasma which is generated uniformly along the through holes of the honeycomb structural body. Then, active oxygen is generated, and the substances to be treated are decomposed and/or oxidized by the thus generated active oxygen. According to the present invention, the active oxygen is generated not only near the inner wall of the through hole, but also over the whole cross-sectional area of the through hole, and therefore the treating efficiency is very high. Further, the substances to be treated are first transformed into intermediate substances by radicals and electrons in the discharge plasma, and then the thus transformed intermediate substances are further treated by the active oxygen. Alternatively, the substances to be treated are first reacted with the active oxygen to produce intermediate substances, and then the thus transformed intermediate substances are reacted with radicals and electrons in the discharge plasma. In this manner, the substances contained in the fluid can be treated very efficiently.

The method and apparatus for treating substances according to the present invention may be used for various applications. Particularly, it is preferable to apply the present invention to city type waste incinerators and large scale industrial waste treating plants, and dioxins, $NO_x$ and $SO_x$ contained in waste gases discharged from these burning systems can be decomposed into harmless substances by the reaction with the discharge plasma generated within the honeycomb structural body. In such applications, it is particularly preferable to generate the discharge plasma within the honeycomb structural body as pulse corona discharge plasma. In such a pulse corona discharge plasma, electrons having sufficiently high energy level for effectively decomposing dioxins can be generated with an extraordinary high density. In this case, in order to decompose harmful substances such as dioxins in an effective manner, it is preferable to generate the pulse corona discharge plasma which can produce electrons having high energy level of 3–10 eV. To this end, it is preferable that a raising edge of a pulse discharge current is larger than $5 \times 10^{10}$ A/second, particularly larger than $1 \times 10^{11}$ A/second and an amplitude of the pulse discharge current is several thousands amperes.

According to the present invention, in order to generate the pulse corona discharge plasma, it is preferable to construct the pulse supply source by a static induction thyristor as a switching element. The static induction thyristor is a semiconductor switching element, and therefore the size is small, power consumption is low, the life time is semi-permanent, maintenance is easy, and costs can be reduced.

According to a first principal structure of the present invention, the discharge plasma is generated within the honeycomb structural body in a direction parallel to a longitudinal direction of the through holes, and according to a second principal structure of the present invention, the discharge plasma is generated within the honeycomb structural body in a direction perpendicular to a longitudinal direction of the through holes.

In a preferred embodiment of the substance treating apparatus according to the first principal structure of the present invention, the electrode system comprises first and second electrodes provided on respective end surfaces of the honeycomb structural body and the first and second electrodes are connected to the power supply source such that a discharge voltage is applied in a direction parallel to a longitudinal direction of the through holes. In such a structure, the first and second electrodes may be formed by first and second mesh electrodes provided on the end surfaces of the honeycomb structural body, or may be formed by metal films applied on the end surfaces of the honeycomb structural body. In the later case, it is preferable that the metal films are extended onto inner walls of the through holes.

In a preferred embodiment of the substance treating apparatus according to the second principal structure of the present invention, the electrode system comprises a cylindrical electrode arrange on the honeycomb structural body and a plurality of wire electrodes passing through holes, the cylindrical electrode being connected to a first output terminal of the power supply source and the plurality of wire electrodes being connected to a second output terminal of the power supply source.

In another preferable embodiment of the substance treating apparatus according to the second principal structure of the present invention, the electrode system comprises first and second groups of a plurality of wire electrodes passing through the through holes, the first and second groups of a plurality of wire electrodes being connected to first and second output terminals, respectively of the power supply source.

In another preferred embodiment of the substance treating apparatus according to the second principal structure of the present invention, the electrode systems comprises a first group of a plurality of strip electrodes each being applied on inner walls of the through holes and a second group of a plurality of strip electrodes each being applied on the inner walls of the through holes to be opposed to the first group strip electrodes, the first and second groups of a plurality of wire electrodes being connected to first and second output terminals, respectively of the power supply source.

In case of using the honeycomb structure, it is preferable to form protrusions and depressions in inner walls of the through holes of the honeycomb structural body. Then, the fluid containing the substances to be treated becomes a turbulent flow and is effectively stirred.

According to the present invention, a plurality of honeycomb structural bodies are arranged in parallel with each other or in series with each other. In the former case, electrodes arranged on one end surfaces of the honeycomb structural bodies are commonly connected to one output terminal of the power supply source and all electrodes provided on the other end surfaces of the honeycomb structural bodies are commonly connected to the other output terminal of the power supply source. In the later case, electrodes arranged on end surfaces of respective honeycomb structural bodies may be connected to a same power supply source or different power supply sources having different output voltages.

According to further aspect of the present invention, an apparatus for treating substances comprises:
- a sleeve electrode;
- a first insulating sleeve made of ceramics containing a material having photocatalysis and arranged in an inner wall of the sleeve electrode, the first insulating sleeve constituting a passage for a fluid containing substances to be treated;
- a wire electrode arrange along a central axis of the first insulating sleeve;
- a second insulating sleeve made of ceramics containing a material having photocatalysis and arranged around the wire electrode; and
- a discharge voltage source connected to the sleeve electrode and wire electrode to generate discharge plasma between the sleeve electrode and the wire electrode;
- wherein the substances contained in the fluid are treated by reaction with the discharge plasma and with active oxygen generated by exciting the material having photocatalysis with radiation emitted from the discharge plasma.

Also in this substance treating apparatus, it is preferable that the discharge voltage source is formed by a pulse supply source to generate pulse corona discharge between the sleeve electrode and the wire electrode. Furthermore, the material having photocatalysis may be $TiO_2$.

DETAILED DESCRIPTION OF THE INVENTION

Now the present invention will be explained in detail with reference to several embodiments shown in the accompanying drawings.

Figure 10:
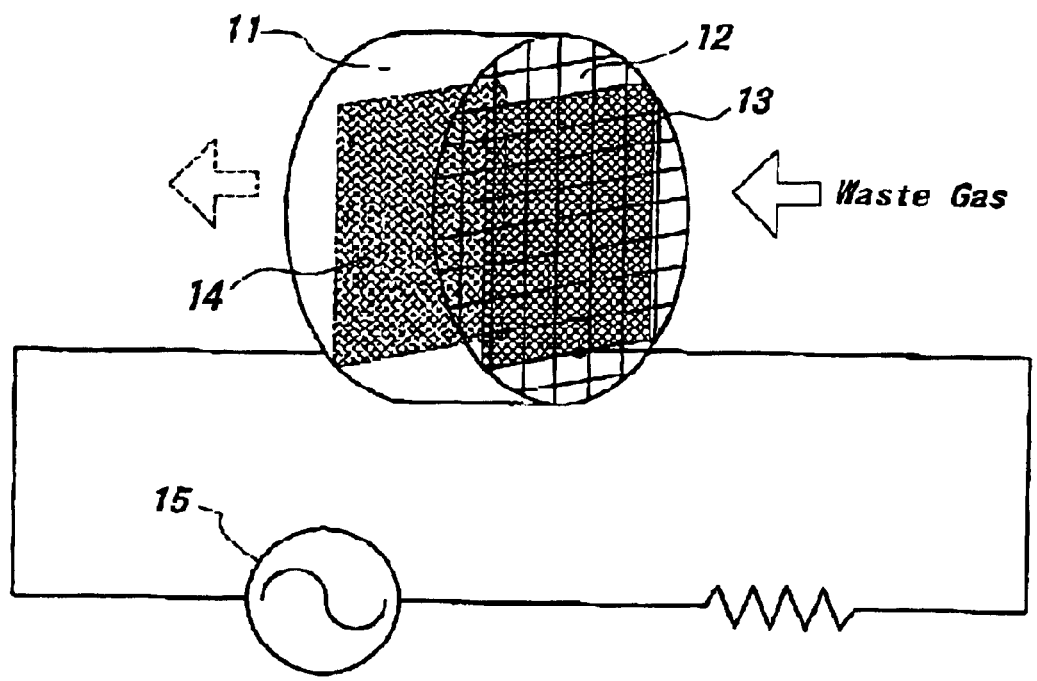
FIG. 10 is a schematic view showing a first embodiment of the substance treating apparatus based on a first principal structure according to the present invention.

FIG. 10 is a schematic view showing a first embodiment of the substance treating apparatus according to the present invention based on the first principal structure. According to the present invention, a honeycomb structural body 11 made of an electrically insulating material is used as a structural member for forming a passage through which a fluid containing substances to be treated is flowed as well as a discharge space for generating discharge plasma. In the first principal structure according to the present invention, a discharging voltage is applied in parallel with a longitudinal direction in which a plurality of through holes 12 formed in the honeycomb structural body 11 extend. In the present embodiment, mesh electrodes 13 and 14 are provided on end surfaces of the honeycomb structural body 11 and an AC voltage supply source 15 is connected across these mesh electrodes 13 and 14. Furthermore, these mesh electrodes 13 and 14 are made of a material having catalysis. In the present embodiment, the mesh electrodes 13 and 14 are made of nickel series metal. According to the present invention, the electrodes may be made of any metal having catalysis such as platinum and palladium. By using the mesh electrodes 13 and 14 having catalysis, harmful substances contained in a fluid flowing through the through holes 12 formed in the honeycomb structural body 11 are liable to be decomposed, and therefore can be effectively decomposed by the reaction with radicals and accelerated electrons generated by the discharge plasma produced within the honeycomb structural body 11.

In the present embodiment, harmful substances such as dioxins, $NO_x$ and $SO_x$ contained in a waste gas emitted from a city type incinerator are decomposed into harmless substances by reacting these harmful substances with radicals and accelerated electrons generated in the discharge plasma which is produced within the honeycomb structural body 11. The honeycomb structural body 11 is made of cordierite ceramics and the through holes 12 are formed with a density of about five holes per one square centimeter. The mesh electrodes 13 and 14 has a mesh size of 40 mesh. Furthermore, the AC supply source 15 has a variable output voltage up to 70 kV and a frequency of several kHz, e.g. 5 kHz.

It should be noted that the number of the through holes 12 per unit surface area of the honeycomb structural body 11, the mesh size of the mesh electrodes 13 and 14, and the output voltage of the high frequency voltage supply source 15, as well as a cross sectional area of a through hole 12 and the length and diameter of the honeycomb structural body 11 may be determined in accordance with the flow rate of a waste gas containing substances to be treated, the concentrations of these substances in the waste gas and the residual concentrations of these substances after the treatment. Mainly due to manufacturing view points, the honeycomb structural body 11 preferably has a length of about 1–100 cm and a diameter of about 5–20 cm. Each through hole 12 has a square cross section having such a size that its inner contact circle is preferably set to about 5–10 mm.

Figure 11:
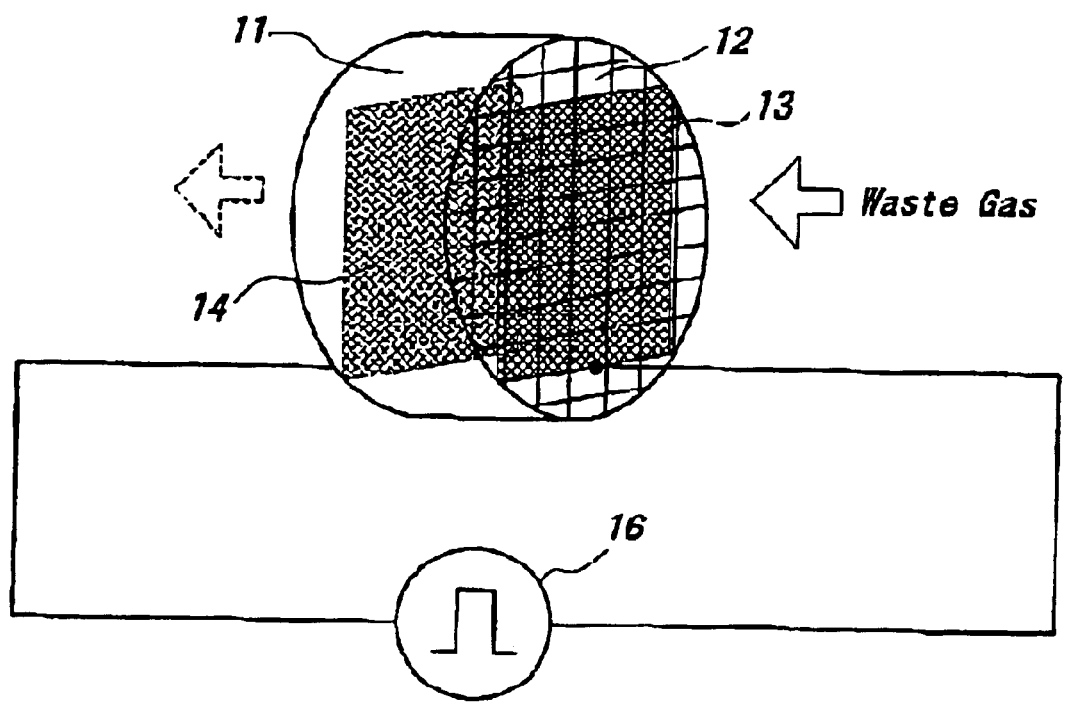
FIG. 11 is a schematic view depicting a second embodiment of the substance treating apparatus based on the first principal structure according to the present invention.

FIG. 11 is a schematic perspective view showing a second embodiment of the substance treating apparatus according to the present invention also based on the first principal structure. In this embodiment, portions similar to those of the first embodiment are denoted by same reference numerals used in FIG. 10 and their detailed explanation is dispensed with. In the first embodiment shown in FIG. 10, the mesh electrodes made of a metal having catalysis 13 and 14 are connected to the AC supply source 15, but in the present embodiment, the mesh electrodes 13 and 14 are connected to a pulse supply source 16. By using the pulse supply source 16, pulse corona discharge plasma is generated in the through holes 12 formed in the honeycomb structural body 11. According to the present invention, the pulse supply source 16 is constructed such that electrons having high energy level such as about 3–10 eV are generated with an extraordinary high density. Then, dioxins contained in a waste gas can be effectively decomposed.

Figure 1:
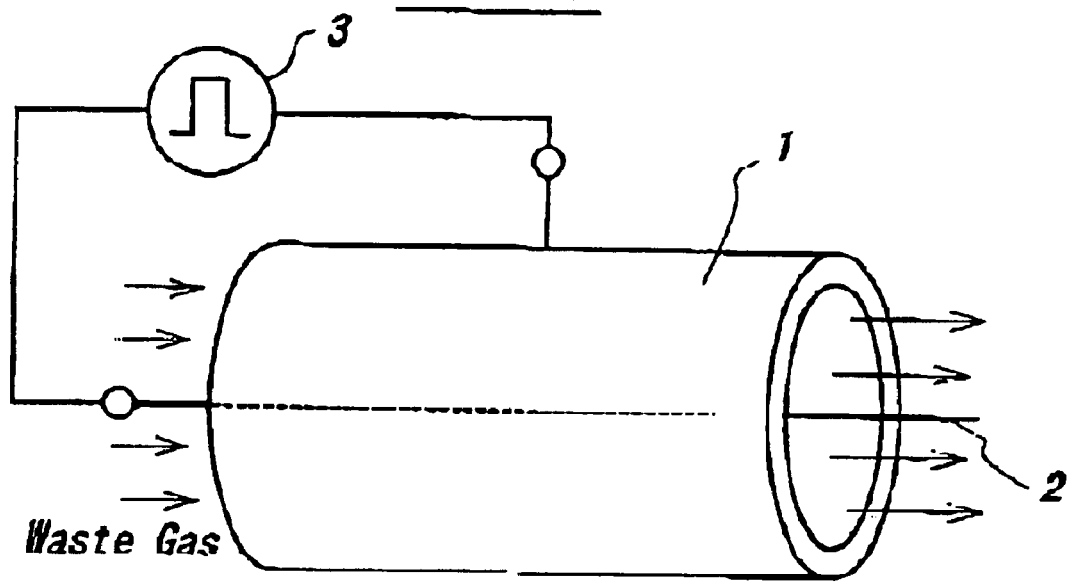
FIG. 1 is a perspective view showing schematically a known waste gas treating apparatus including a pipe-like electrode and a wire electrode.
Figure 2:
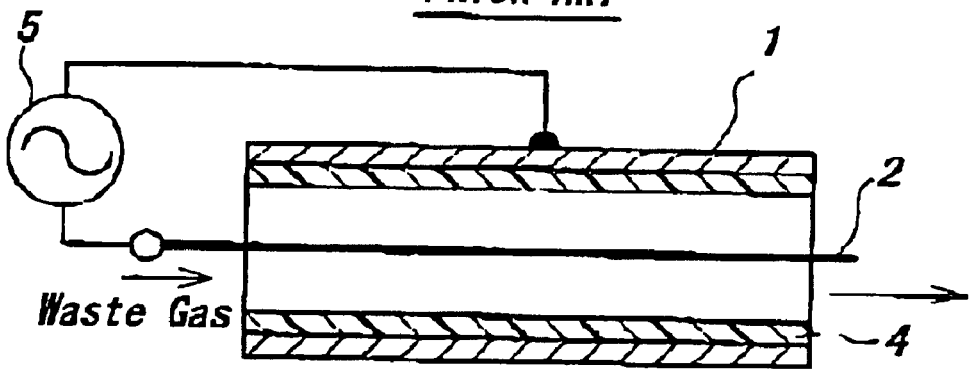
FIG. 2 is a schematic cross sectional view illustrating a known waste gas treating apparatus utilizing a dielectric barrier discharge.
Figure 3:
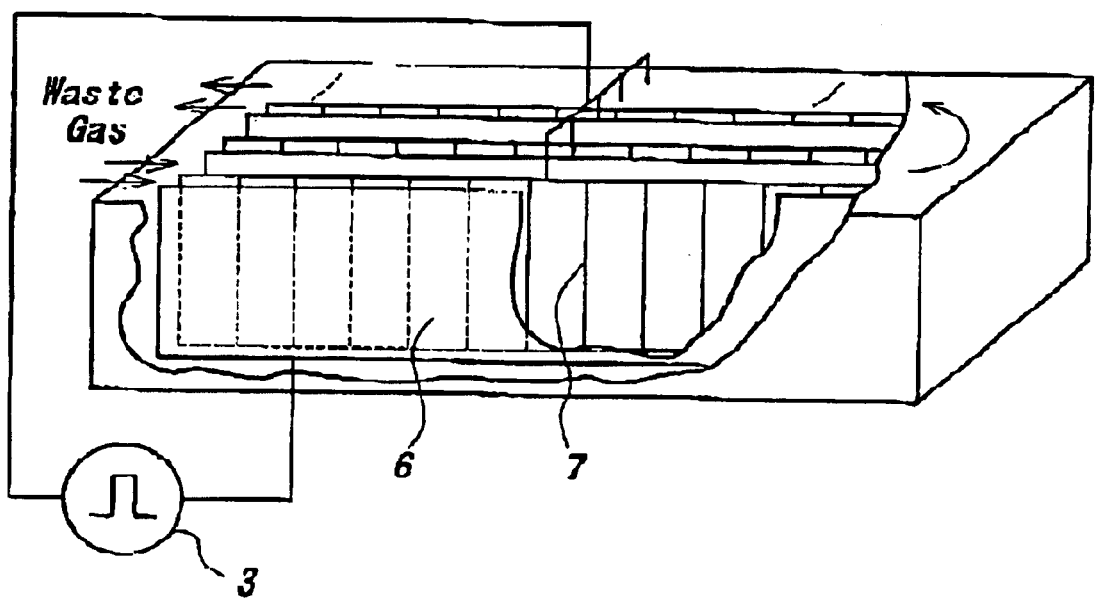
FIG. 3 is a perspective view depicting schematically a known waste gas treating apparatus utilizing corona discharge generated by plate electrodes and wire electrodes.
Figure 4:
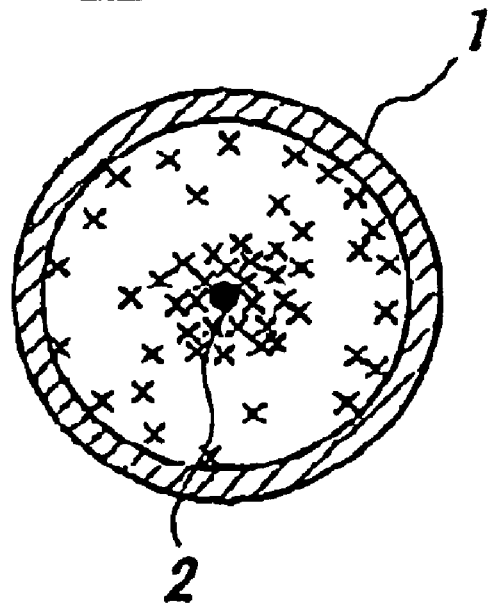
FIGS. 4 and 5 are lateral and longitudinal cross sectional views, respectively showing a discharge condition in the known waste gas treating apparatus shown in FIG. 1.
Figure 5:
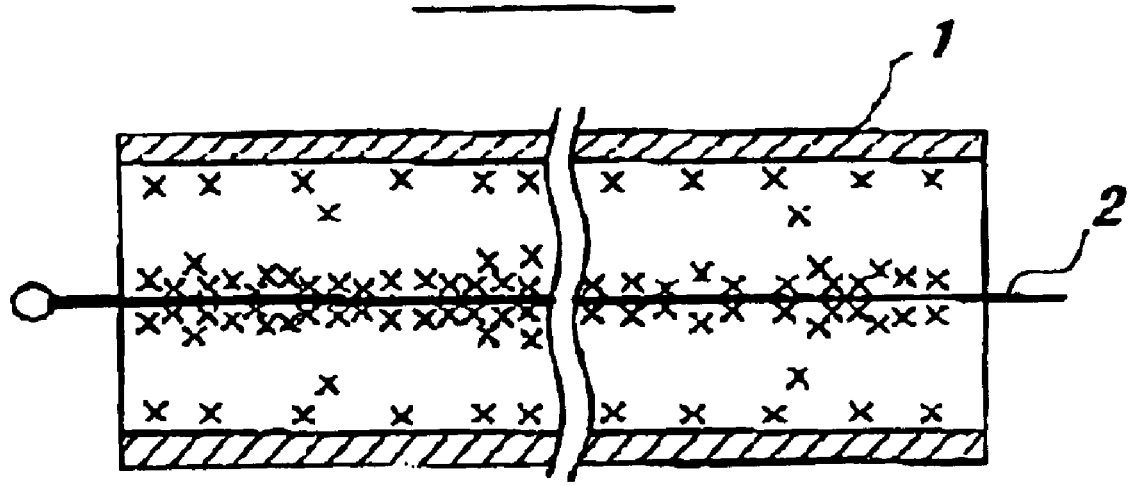
Figure 6:
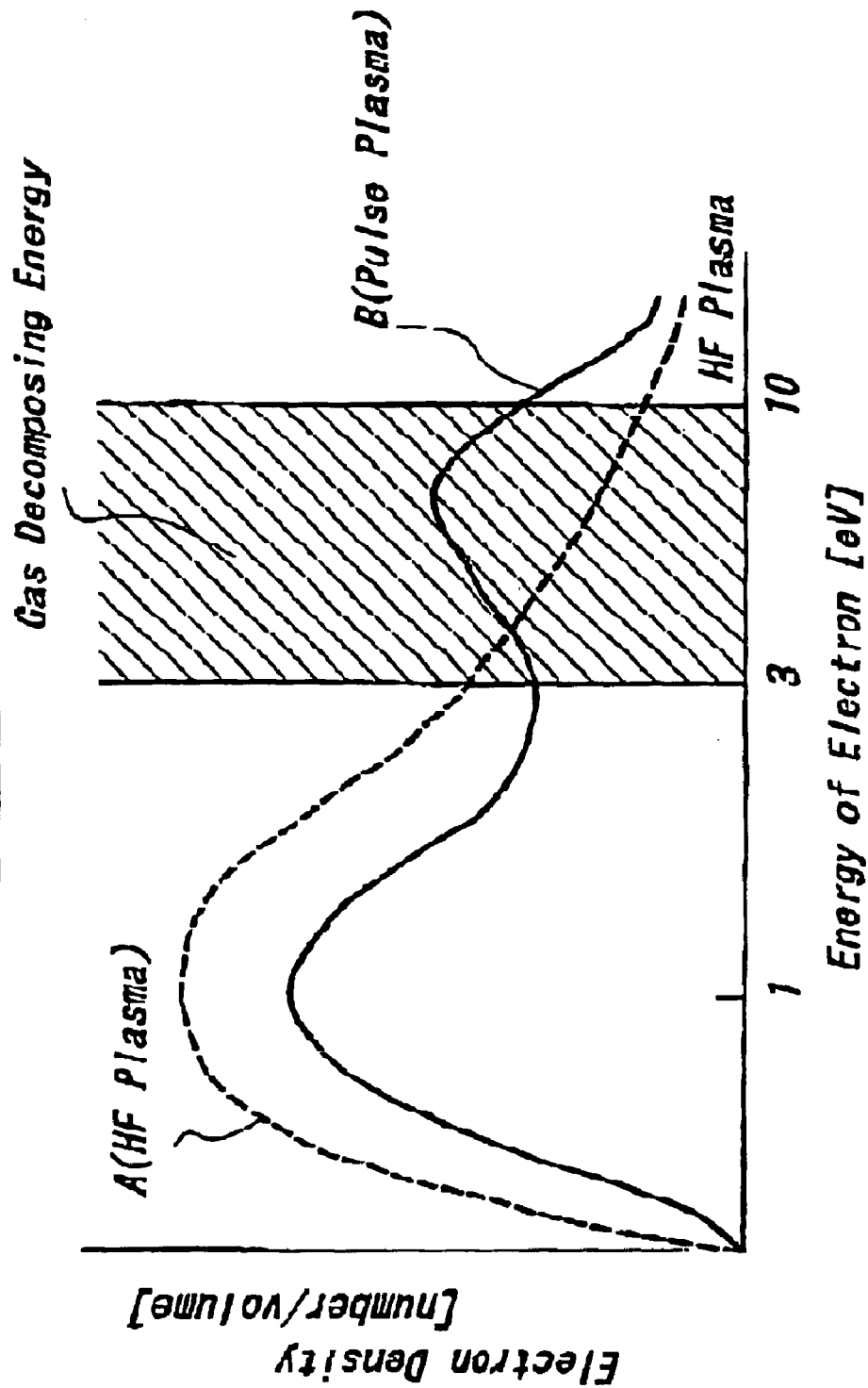
FIG. 6 is a graph showing a relationship between energy and density of electrons generated in known high frequency plasma.
Figure 7:
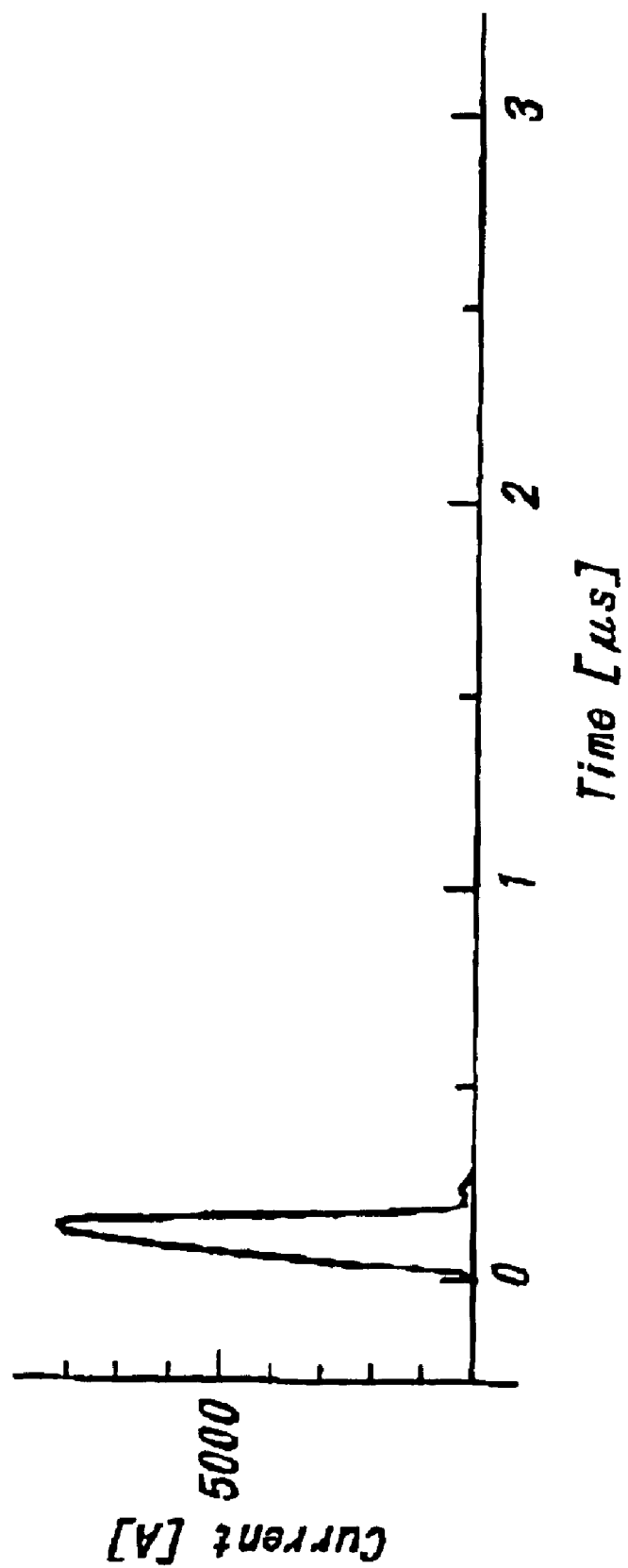
FIGS. 7, 8 and 9 are graphs illustrating a waveform of pulses generated by pulse supply sources using thyratron, GTO and IGBT, respectively.
Figure 8:
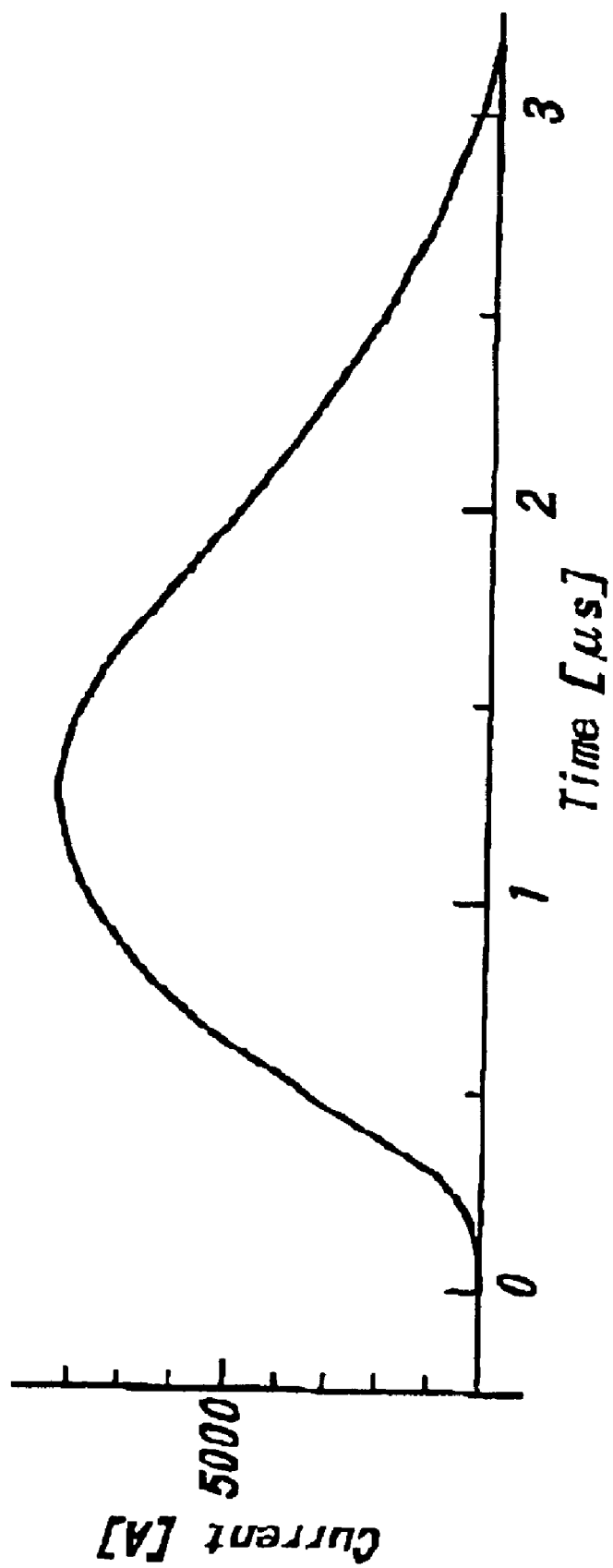
Figure 9:
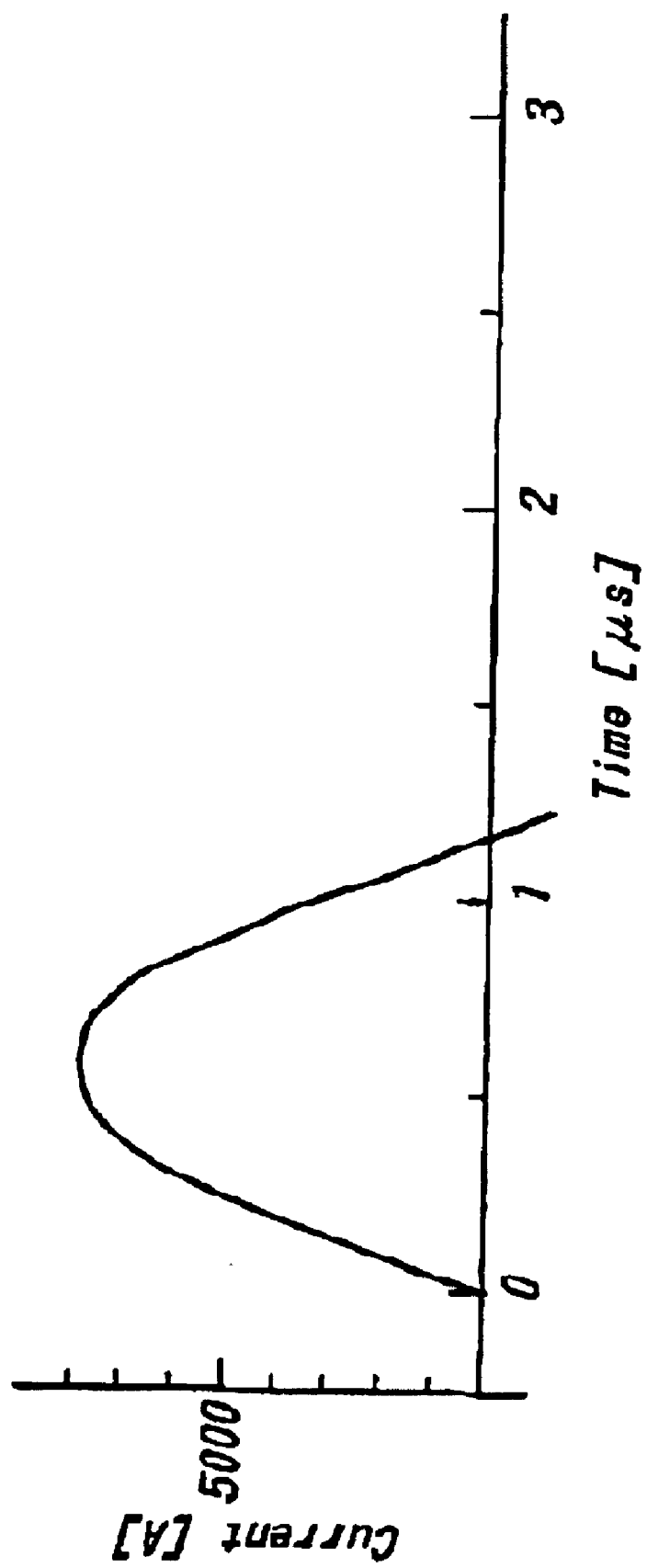

As explained above, in the present invention, by using the pulse supply source 16, it is possible to generate electrons having high energy of about 3–10 eV with an extraordinary high density as represented by a curve B in FIG. 6. Such electrons having energy of about 3–10 eV can decompose dioxins in an efficient manner, and therefore an ability for treating a waste gas can be improved. Furthermore, in the present embodiment, the mesh electrodes 13 and 14 are made of a metal having catalysis and harmful substances are liable to be decomposed. In this manner, the decomposition of harmful substances contained in the waste gas can be further improved by a synergic effect of the catalysis of the mesh electrodes and the high energy electrons generated by the pulse corona discharge plasma.

In order to generate electrons having high energy of about 3–10 eV for decomposing dioxins efficiently with a high density, the pulse supply source 16 is preferable constructed such that a raising edge of a pulse corona discharge current is higher than $5 \times 10^{10}$ A/sec, particularly $1 \times 10^{10}$ A/sec, the output voltage is higher than 10–70 kV and the conduction current is several thousands amperes. By using such a pulse supply source, a pulse voltage applied across the discharging electrodes can have a raising rate of about $1 \times 10^{12}$ V/sec. Such a pulse supply source may be constructed by a thyratron, but the pulse supply source including the thyratron has various drawbacks such as large size, high power consumption, short life time (i.e. $10^9$ shots), cumbersome maintenance and a high cost.

Figure 12:
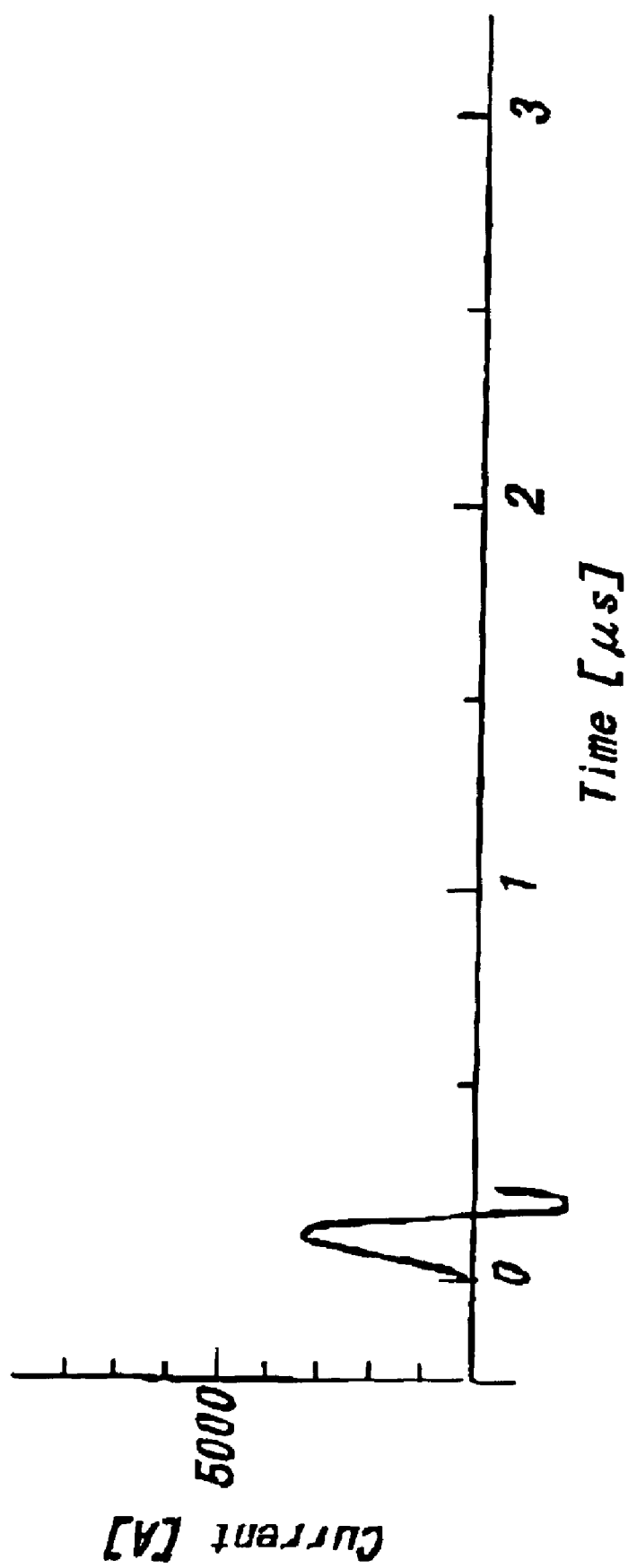
FIG. 12 is a graph showing a waveform of a pulse generated by a pulse supply source utilizing a static induction thyristor.

According to the present invention, in order to mitigate the above mentioned drawbacks of the pulse supply source, use is made of a pulse supply source including a static induction thyristor as a switching element. FIG. 12 is a graph showing a property of the static induction thyristor. From this graph, it is apparent that the static induction thyristor has a very steep raising edge and can conduct a very large current. Of course, the static induction thyristor is a semiconductor element, the size is small, i.e. $\phi 50$ to $\phi 100$ mm, the power consumption is very low, the life time is substantially semi-permanent, maintenance is easy and the cost is low. In this manner, the pulse supply source having the static induction thyristor as a switching element is most suitable for the pulse supply source of the substance treating apparatus according to the present invention. According to the present invention, the amplitude of the pulse voltage is about 10–70 kV and the pulse repetition frequency is several kHz to 10 kHz.

Figure 13:
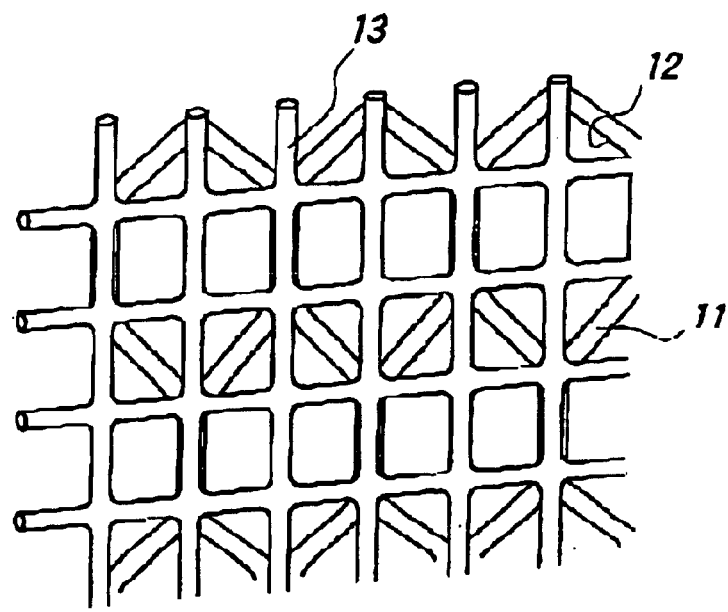
FIG. 13 is a perspective view illustrating a part of a mesh electrode of a third embodiment of the substance treating apparatus according to the present invention.
Figure 14:
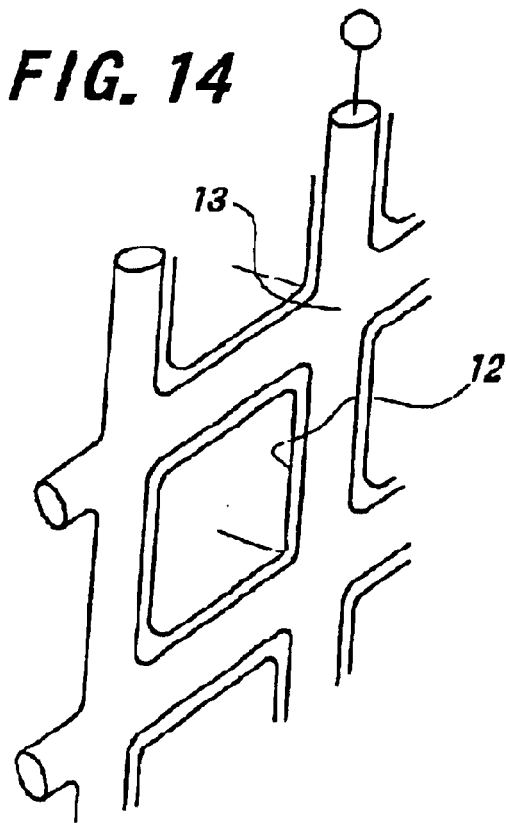
FIG. 14 is a perspective view illustrating a part of a mesh electrode of a fourth embodiment of the substance treating apparatus according to the present invention.

FIGS. 13 and 14 are perspective views showing mesh electrodes of third and fourth embodiments, respectively of the substance treating apparatus according to the present invention. Also in these third and fourth embodiments, the mesh electrodes are made of a metal having catalysis. In the third embodiment shown in FIG. 13, through holes 12 of the honeycomb structural body 11 have a hexagonal cross section and the mesh electrode 13 has rectangular openings. In the fourth embodiment illustrated in FIG. 14, through holes 12 of the honeycomb structural body 11 have a square cross section and the mesh electrode 13 has corresponding square openings so that the openings of the mesh electrode are not covered with the mesh electrode. According to the present invention, it is not always necessary to make size and configuration of the mesh of the electrode 13 and the through hole 12 of the honeycomb structural body 11 identical with each other. It is important to construct the mesh electrode and through hole such that discharge plasma is generated uniformly over the whole structure of the honeycomb structural body.

Figure 15:
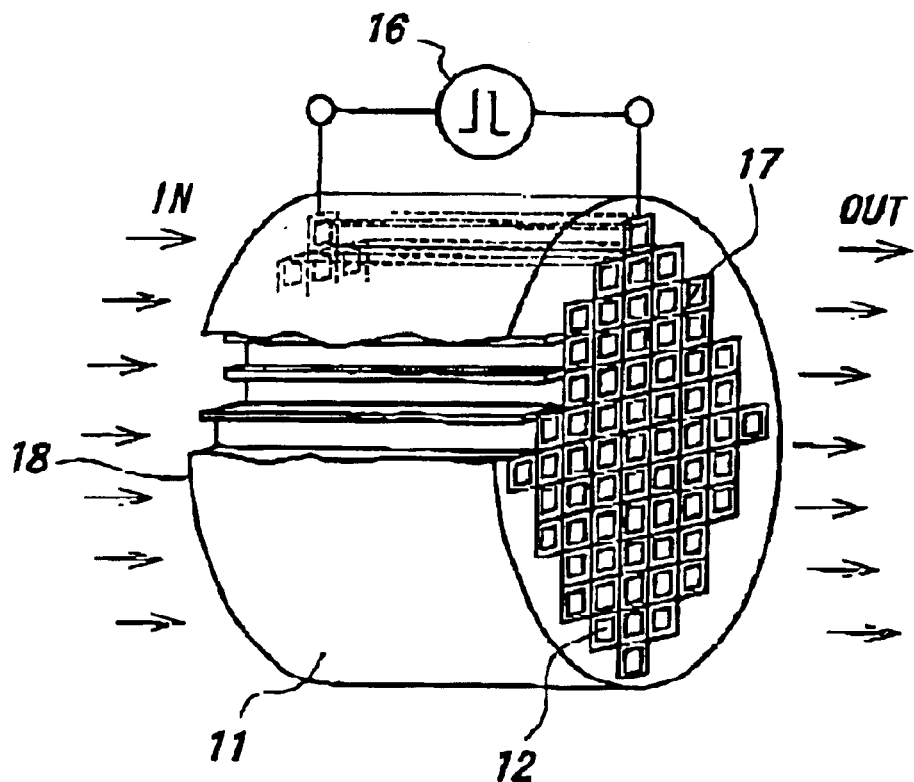
FIG. 15 is a perspective view illustrating a fifth embodiment of the substance treating apparatus according to the present invention, in which mesh electrodes are applied to end surfaces of a honeycomb structural body.
Figure 16:
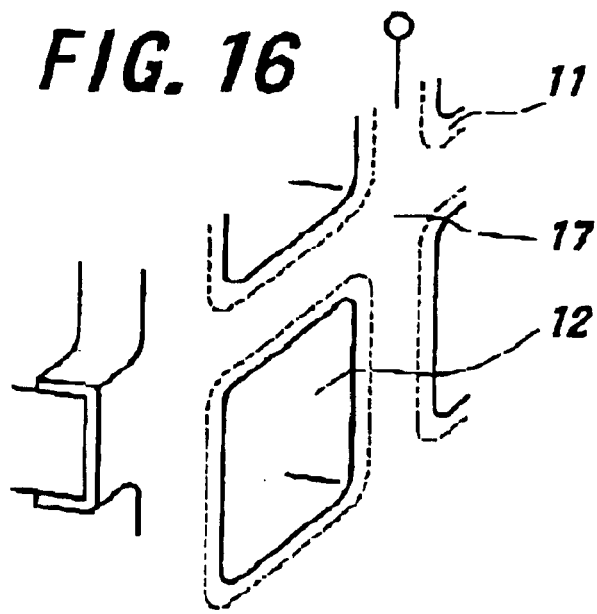
FIG. 16 is a perspective enlarged view representing a part of the mesh electrode shown in FIG. 15.

FIG. 15 is a perspective view showing a fifth embodiment of the substance treating apparatus according to the present invention based on the first principal structure, and FIG. 16 is a perspective view illustrating a mesh electrode on an enlarged scale. In the present embodiment, mesh electrodes 17 and 18 are formed by metal layers applied on end surfaces of a honeycomb structural body 11. In this manner, it is possible to obtain the mesh electrodes which do not clog through holes 12 of the honeycomb structural body 11. The mesh electrodes 17 and 18 are connected to a pulse supply source 16. In the present embodiment, the mesh electrodes 17 and 18 extend onto inner walls of the through holes 12 to increase the contact surface of the mesh electrodes with the waste gas.

Figure 17:
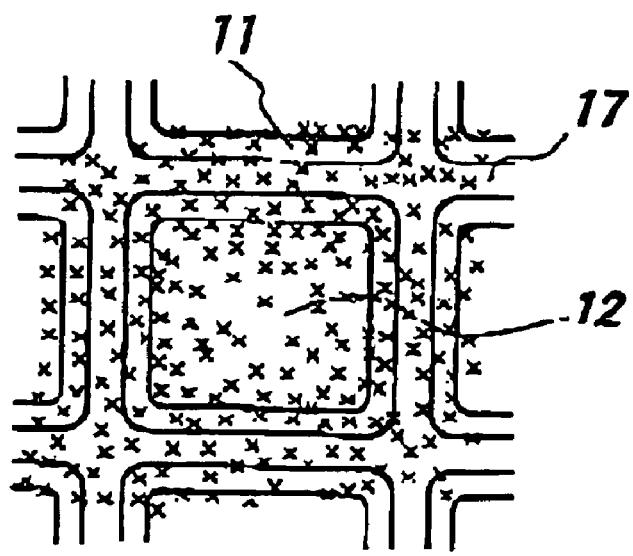
FIGS. 17 and 18 are lateral and longitudinal cross sectional views, respectively showing a condition of pulse corona discharge in the embodiment shown in FIG. 15.
Figure 18:
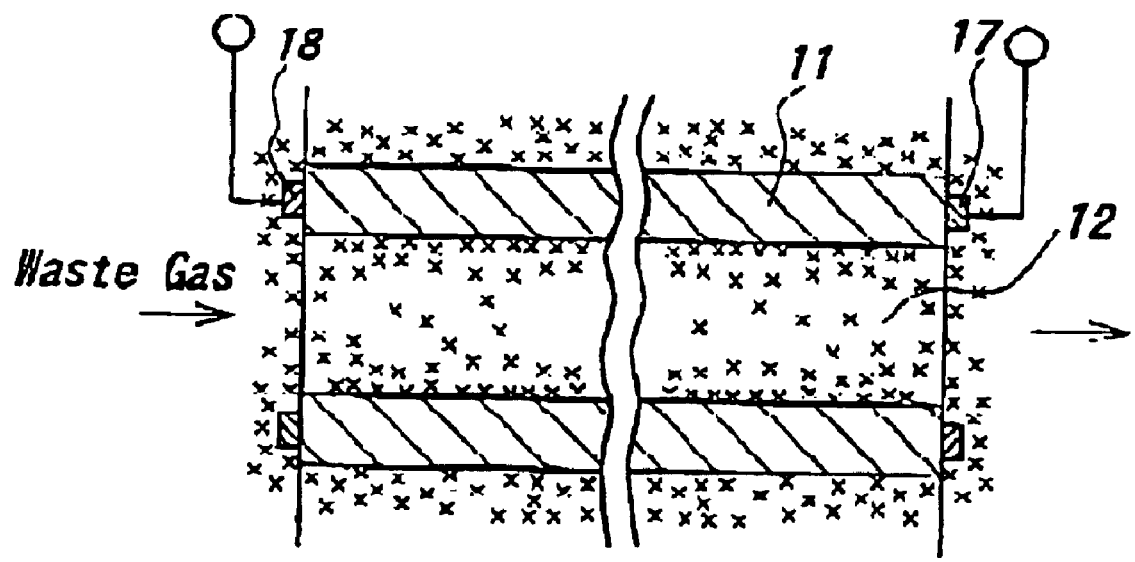

FIGS. 17 and 18 are lateral and longitudinal cross sectional views, respectively representing a condition of pulse corona discharge plasma generated along the through holes 12 of the honeycomb structural body 11 when a pulse is applied to the mesh electrodes from the pulse supply source 16. As illustrated in these figures, discharge plasma is generated uniformly along the through holes 11 of honeycomb structural body 11, and therefore dioxins contained in waste gas can be effectively reacted with high energy electrons and radicals generated by the discharge plasma. In this manner, dioxins can be decomposed effectively. The inventors have confirmed that the discharge plasma is a surface discharge produced along the inner walls of the through holes 12 formed in the honeycomb structural body 11.

Figure 19:
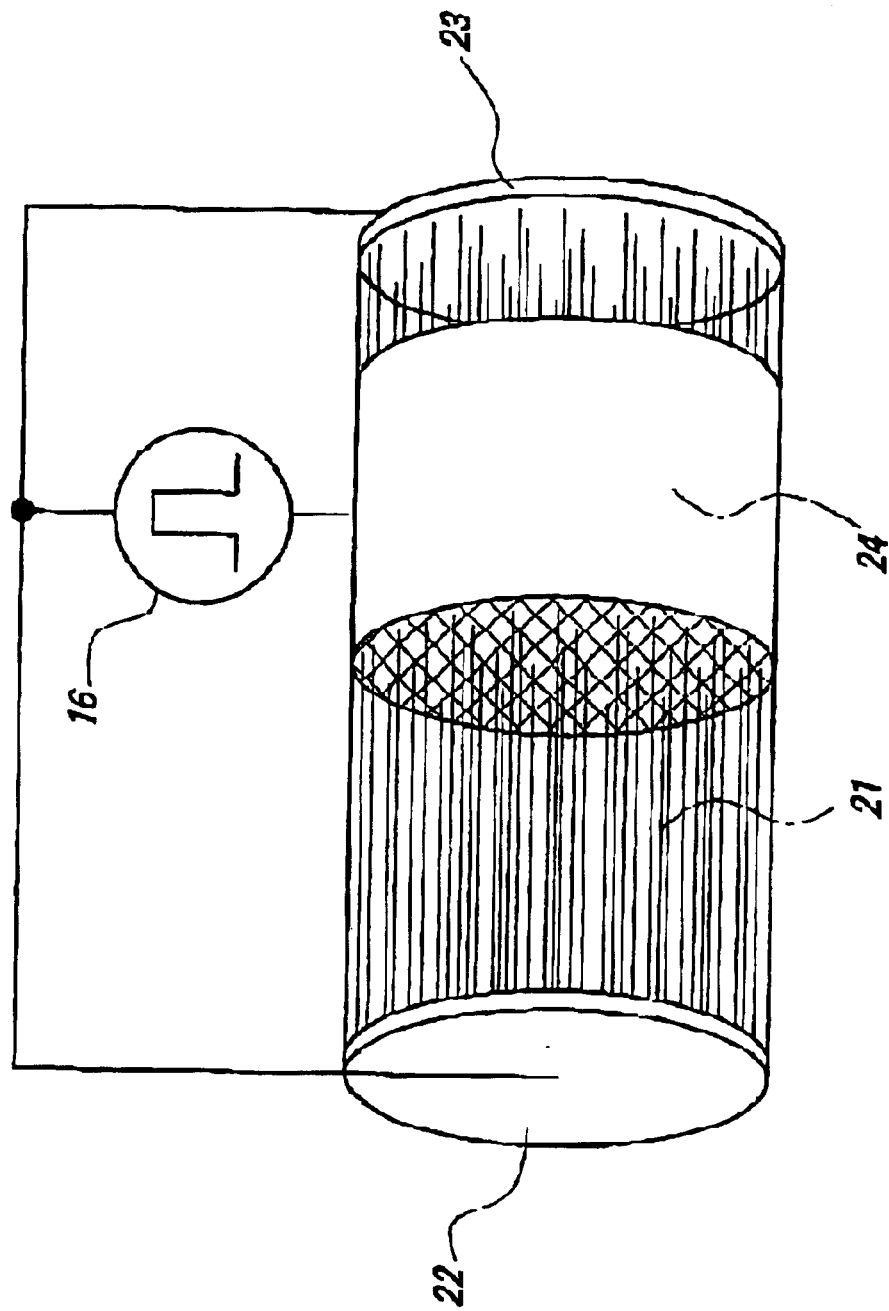
FIGS. 19, 20, 21 and 22 are schematic views illustrating sixth, seventh, eighth and ninth embodiments, respectively of the substance treating apparatus according to the present invention based on the second principal structure.

In the first to fifth embodiments explained above, the discharging voltage is applied in a direction parallel to a longitudinal direction of the through holes 12 formed in the honeycomb structural body 11. In the second principal structure according to the present invention, the discharging voltage is applied in a direction perpendicular to the longitudinal direction of the through holes. FIG. 19 is a perspective view showing a sixth embodiment of the substance treating apparatus according to the present invention based on the second principal structure. In the present embodiment, a plurality of wire electrodes 21 are passed through the through holes 12, the wire electrodes being made of a metal having catalysis. One end of each wire electrode 21 is secured to a first conductive plate 22 and the other end of each wire electrode 21 is secured to a second conductive plate 23. The first and second conductive plates 22 and 23 are connected to one of the output terminals of a pulse supply source 16, and the other output terminal of the pulse power supply source is connected to a cylindrical electrode 24 arranged on the honeycomb structural body 11. In this case, it is not necessary to pass the wire electrodes 21 having catalysis through all the through holes 12. According to the present invention, it is preferable to spread the wire electrodes 21 uniformly over the through holes 12.

Figure 20:
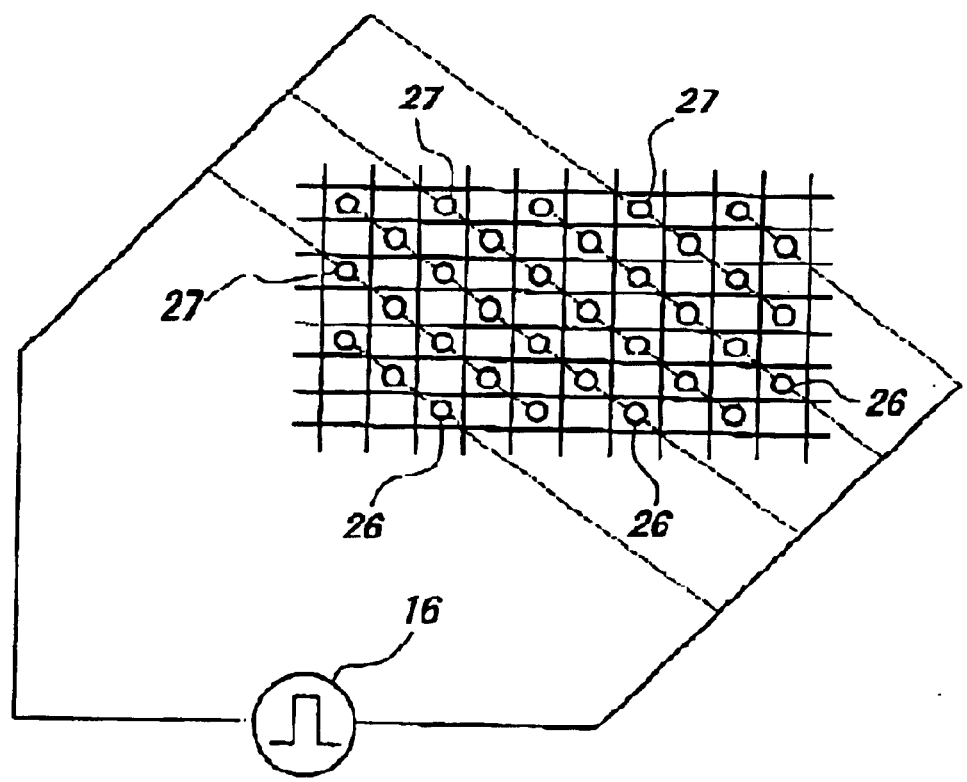

FIG. 20 is a schematic view illustrating a seventh embodiment of the substance treating apparatus according to the second principal structure of the present invention. In the above mentioned sixth embodiment shown in FIG. 19, one of the discharging electrodes is constituted by a cylindrical electrode 24 arranged around the honeycomb structure 11, but in the present embodiment, all discharging electrodes are formed by wire electrode made of a metal having catalysis and are passed through the through holes 12. That is, a first group of wire electrodes 26 are connected to one of the output terminals of a pulse supply source 16 and a second group of wire electrodes 27 are connected to the other output terminal of the pulse supply source 16. In this case, the wire electrodes 26 and 27 of the first and second groups are arranged to be distributed uniformly.

Figure 21:
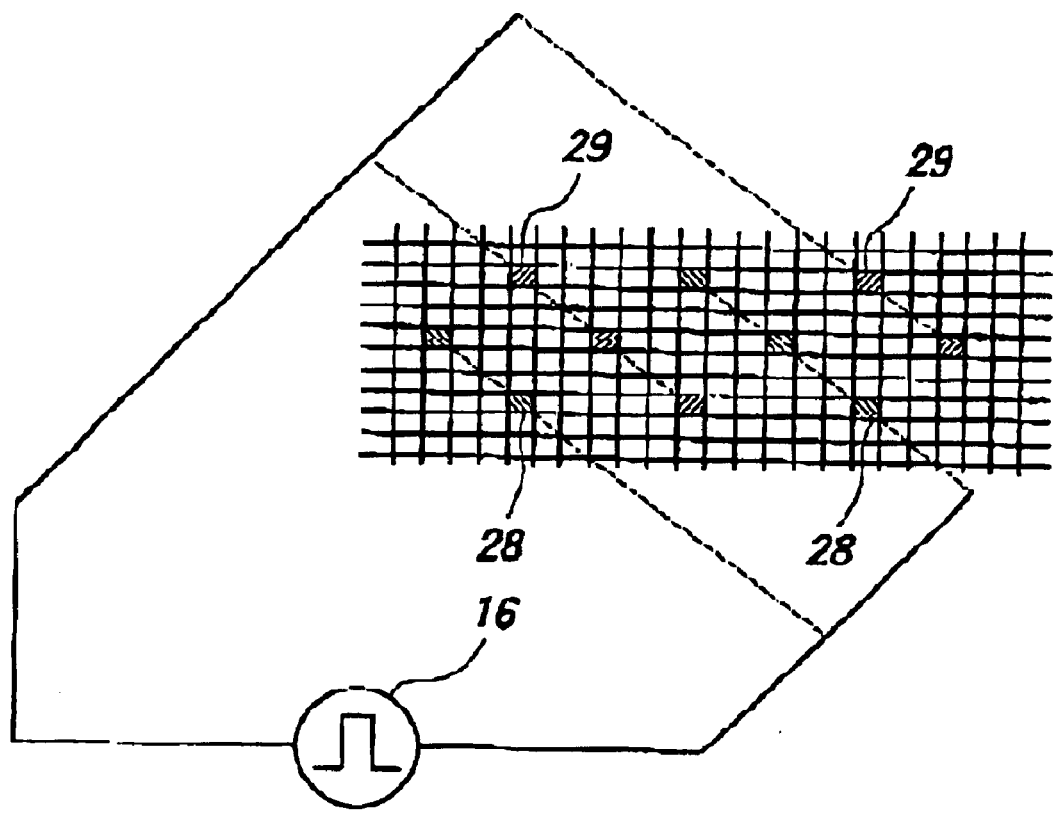

FIG. 21 is a schematic view depicting an eighth embodiment of the substance treating apparatus according to the second principal structure of the invention. In the present embodiment, a honeycomb structural body 11 is made of ceramics including $TiO_2$ having photocatalysis. Discharging electrodes are formed by rod electrodes 28 and 29 formed by injecting a conductive material into through holes 12 of the honeycomb structural body 11. In this case, a through hole 12 having a rod electrode formed therein is completely clogged, and therefore the rod electrodes 28 and 29 are preferably distributed with a lower density (i.e., in fewer of the through holes 12) than the previous embodiments.

In the present embodiment, a discharging voltage is applied in a direction perpendicular to a longitudinal direction of the through holes 12 of the honeycomb structural body 11 and discharge plasma is generated within through holes in which the rod electrodes 28 and 29 are not provided. The photocatalysis material contained in the ceramic honeycomb 11 is excited with ultraviolet radiation emitted from the discharge plasma to produce active oxygen. Harmful substances contained in a waste gas flowing through the through holes 12 are decomposed or oxidized by active oxygen. In this case, active oxygen is generated not only near the inner walls of the through holes 12, but also apart from the inner walls. Therefore, the possibility of a reaction between the harmful substances in the waste gas and the active oxygen is increased and the treating efficiency is further improved.

Figure 22:
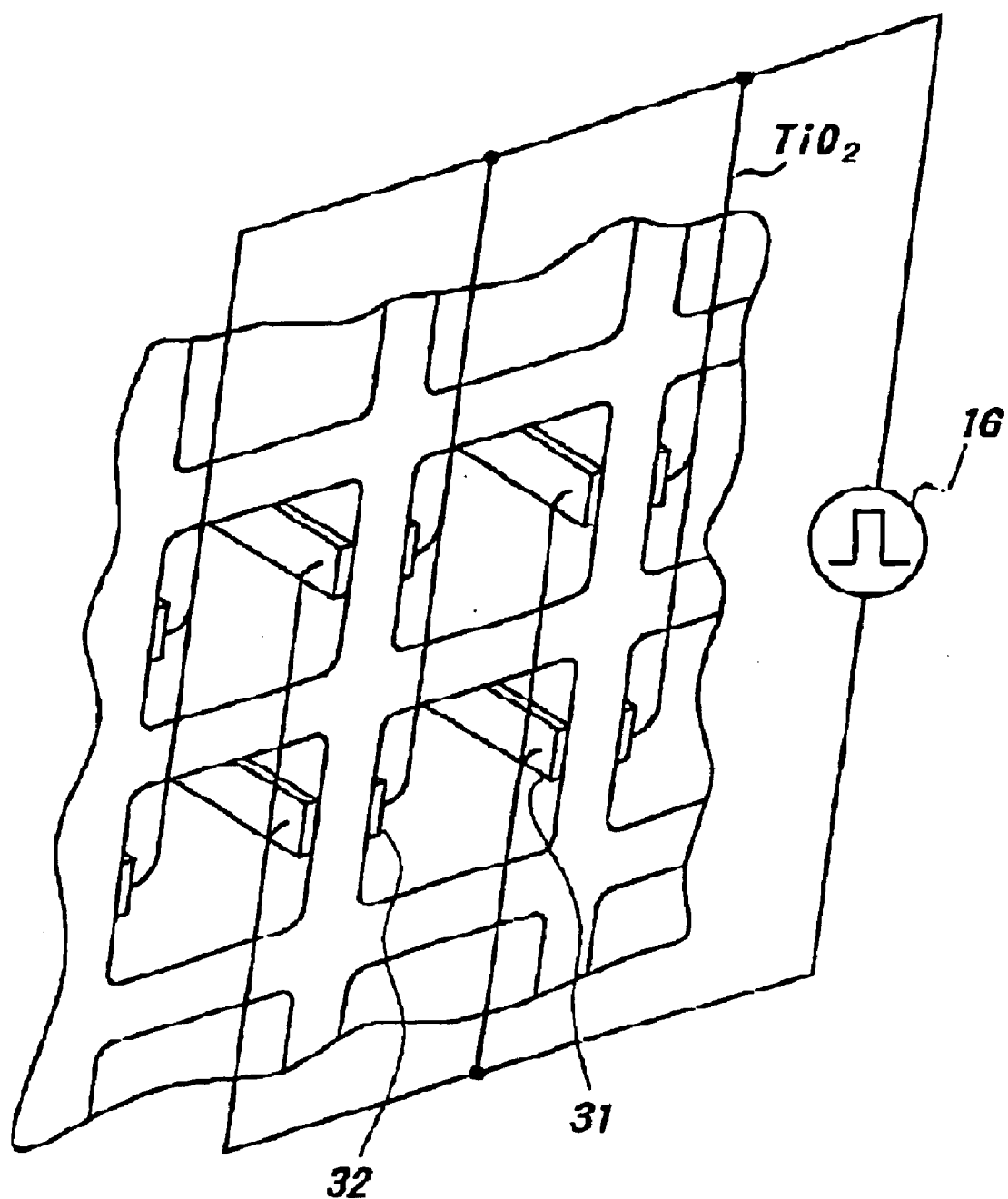

FIG. 22 is a perspective view depicting a ninth embodiment of the substance treating apparatus according to the second principal structure of the present invention. In the present embodiment, a honeycomb structural body 11 is made of ceramics containing a photocatalysis material, and first and second strip electrodes 31 and 32 made of a metal having catalysis are secured on inner walls of through holes 12 formed in the honeycomb structural body 11. The first and second strip electrodes 31 and 32 are connected to a pulse supply source 16. The strip electrodes 31 and 32 may be formed by applying a suitable mask on an inner wall of a through hole, a metal having catalysis is deposited on the inner wall, and then the mask is removed. Alternatively, a metal having catalysis may be first applied on an inner wall of a through hole and then, a part of the metal film may be removed by using a suitable mask. It is preferable to provide the strip electrodes 31 and 32 in all the through holes 12, but according to the present invention, it is not always necessary to do so.

Figure 23:
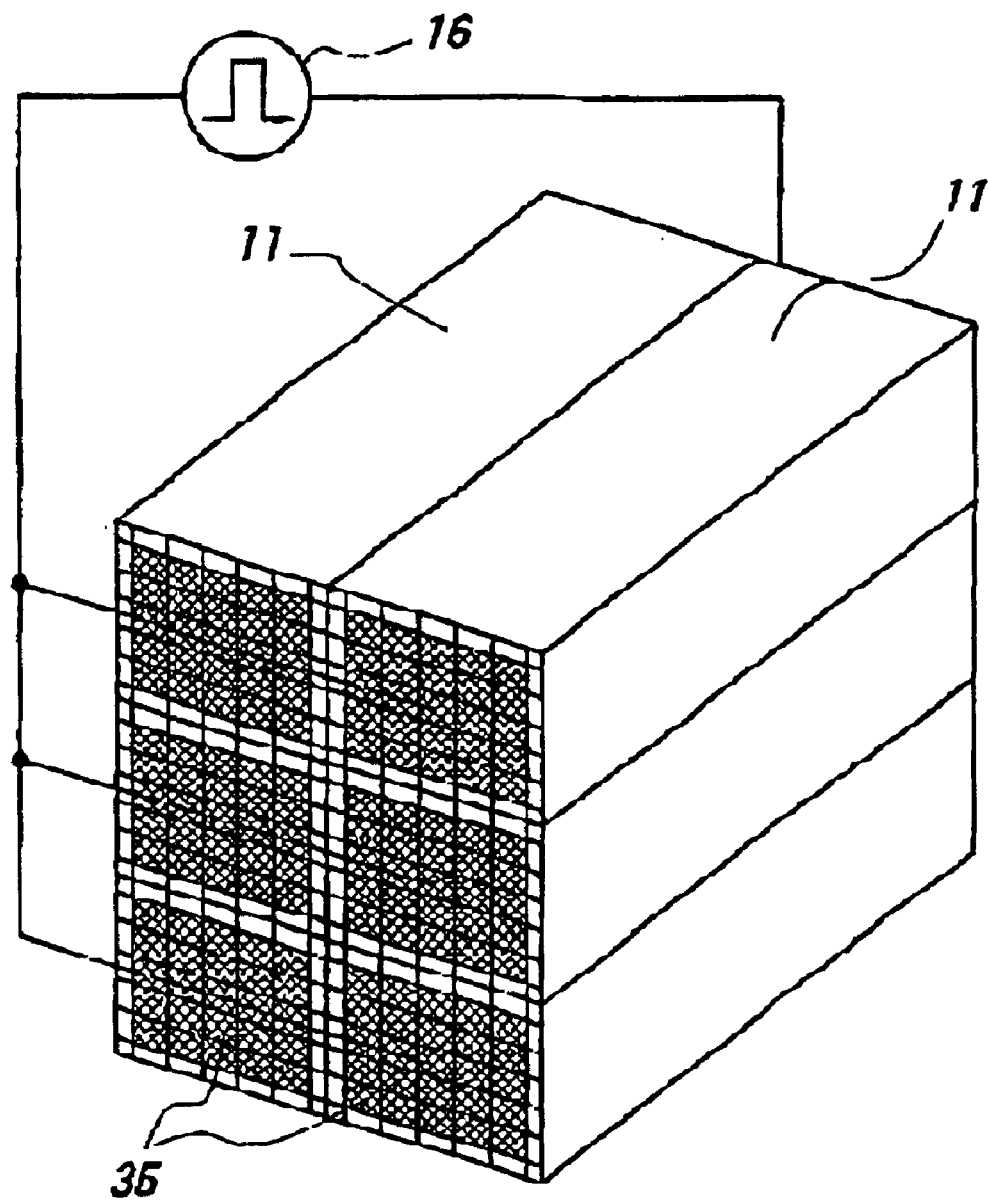
FIG. 23 is a schematic perspective view illustrating a tenth embodiment of the substance treating apparatus according to the present invention, in which a plurality of honeycomb structural bodies are arranged in parallel.

In the embodiments explained thus far, only a single honeycomb structural body 11 is provided, but in the case of treating a large amount of a waste gas, a single honeycomb structural body could not provide a sufficiently large cross sectional area. In a tenth embodiment of the substance treating apparatus according to the present invention shown in FIG. 23, a plurality of honeycomb structural bodies 11 are arranged in parallel with each other to obtain a large cross sectional area through which a waste gas flows. Mesh electrodes 35 arranged on one end surfaces of respective honeycomb structural bodies 11 are commonly connected to one output terminal of a pulse supply source 16 and mesh electrodes 36 provided on the other end surfaces of honeycomb structural bodies 11 are commonly connected to the other output terminal of the pulse supply source 16. In this manner, the plurality of honeycomb structural bodies 11 are arranged in parallel with each other with respect to the flow of a waste gas to be treated as well as electrically. According to the present invention, the honeycomb structural bodies 11 may be made of ceramics containing a material having photocatalysis and/or the mesh electrodes 35 and 36 may be made of a metal having catalysis.

Figure 24:
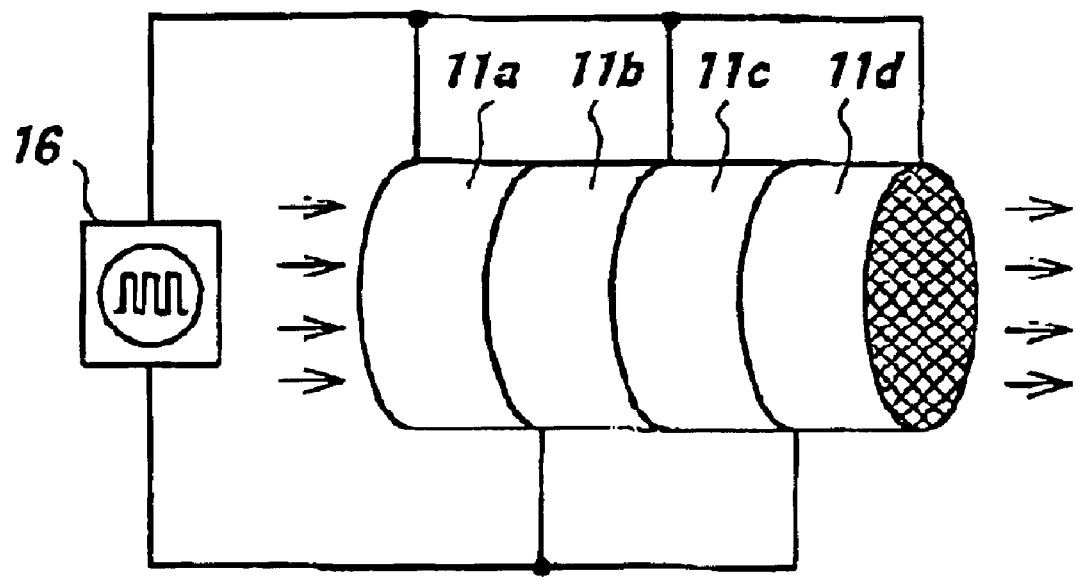
FIG. 24 is a schematic perspective view illustrating an eleventh embodiment of the substance treating apparatus according to the present invention, in which a plurality of honeycomb structural bodies are arranged in series.

When the concentration of harmful substances contained in the waste gas is high, or when an allowable residual amount of harmful substances in a treated gas must be very small, it is not sufficient to flow the waste gas through a single honeycomb structural body. In such a case, a longer honeycomb structural body may be used. However, in this case, the discharging voltage might be extremely high. In an eleventh embodiment of the substance treating apparatus according to the present invention, a plurality of honeycomb structural bodies 11a, 11b, 11c and 11d are arranged in series with each other as depicted in FIG. 24. In such a tandem arrangement, mesh electrodes arranged on end surfaces of honeycomb structural bodies are alternately connected to first and second output terminals of a pulse supply source 16. Also in the present embodiment, one or more of the honeycomb structural bodies 11a, 11b, 11c and 11d may be made of ceramics containing a material having photocatalysis and/or one or more mesh electrodes may be made of a metal having catalysis.

Figure 25:
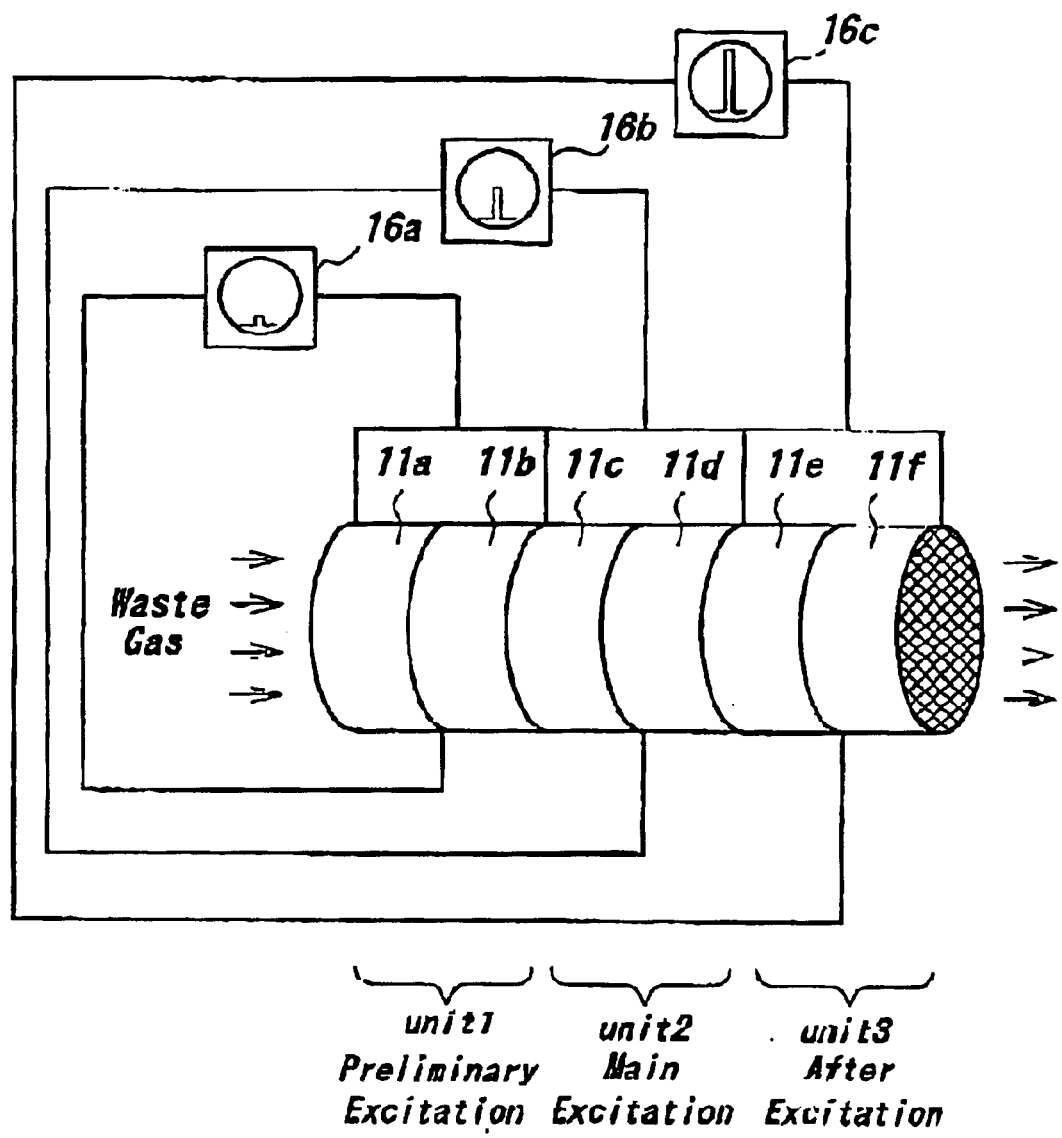
FIG. 25 is a schematic perspective view showing a twelfth embodiment of the substance treating apparatus according to the present invention, in which a plurality of honeycomb structural bodies are arranged in series.

FIG. 25 is a schematic perspective view showing a twelfth embodiment of the substance treating apparatus according to the present invention, in which a plurality of honeycomb structural bodies 11a –11f are arranged in series with each other. In the eleventh embodiment shown in FIG. 24, all the honeycomb structural bodies have the same configuration and size and the same discharging voltage is applied across end surfaces of respective honeycomb structural bodies. In the present embodiment, the honeycomb structural bodies 11a –11f have different lengths and different discharging voltages are applied to the honeycomb structural bodies. That is to say, viewed in a direction of a flow of a waste gas, first two honeycomb structural bodies 11a and 11b have a short length and mesh electrodes arranged on end surfaces of these honeycomb structural bodies are connected to a first pulse supply source 16a. Next, two honeycomb structural bodies 11c and 11d have a long length and mesh electrodes arranged on end surfaces of these honeycomb structural bodies are connected to a second pulse supply source 16b. The remaining two honeycomb structural bodies 11e and 11f have a short length and the mesh electrodes arranged on end surfaces of these honeycomb structural bodies are connected to a third pulse supply source 16c.

The first two honeycomb structural bodies 11a and 11b connected to the first pulse supply source 16a constitute a preliminary exciting region for preliminary exciting harmful substances contained in a waste gas. Therefore, the mesh electrodes arranged on end surfaces of these honeycombs structural bodies 11a and 11b are made of a metal having catalysis such that harmful substances can be effectively decomposed preliminary. The next two honeycomb structural bodies 11c and 11d constitute a main exciting region for decomposing harmful substance preliminarily excited in the preliminary exciting region into harmless substances and/or substances which could be easily collected by a later simple treatment. Therefore, it is preferable to make the honeycomb structural bodies 11c and 11d of a material having photocatalysis. The remaining two honeycomb structural bodies 11e and 11f constitute an after exciting region for decomposing residual harmful substances with electrons having higher energy. Output peak voltages of the first, second and third pulse supply sources 16a, 16c and 16c are set to 15 kV, 20 kV and 30 kV, respectively. In the present embodiment, the honeycomb structural body has through holes of square cross section having a side of 6 mm. According to the present invention, the size and configuration of the through holes of the honeycomb structural body and the amplitude and pulse duration of the pulse voltage may be determined such that suitable discharge conditions can be attained.

Figure 26:
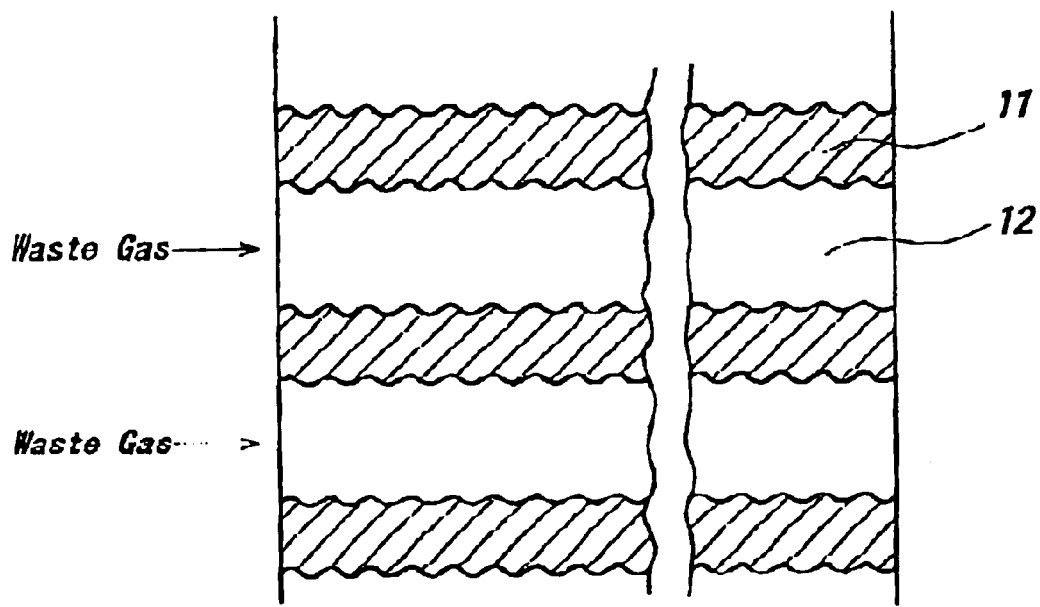
FIG. 26 is a cross sectional view depicting a thirteenth embodiment of the substance treating apparatus according to the present invention, in which depressions and protrusions are formed in an inner wall of a through hole of a honeycomb structural body.

FIG. 26 is a cross sectional view showing a configuration of inner walls of through holes 12 of a honeycomb structural body 11 of a thirteenth embodiment of the substance treating apparatus according to the present invention. In the previous embodiments, the through holes 12 have flat or smooth inner walls, but in the present embodiment, protrusions and depressions are formed in the inner walls of through holes 12 as illustrated in FIG. 26. Such a configuration of the inner walls of through holes 12 may be easily obtained by forming a number of ring-shaped recesses or by forming small protrusions regularly or at random. In the present embodiment, the protrusions and depressions are formed over the whole inner wall of through hole 12, but according to the present invention, they may also be formed over a part of the inner wall. Particularly, when the honeycomb structural body 11 is made a material having photocatalysis, it is preferable to form protrusions and depressions over the whole surface of a through hole 12.

When the through holes 12 have protrusions and depressions, the waste gas is disturbed to generate a turbulent flow. Then, the waste gas is stirred effectively and the possibility of reacting the harmful substances with the high energy electrons generated by the discharge plasma is increased. In this manner, the treating efficiency can be further improved. It should be noted that the formation of protrusions and depressions in the inner walls of through holes 12 does not substantially affect the generation of discharge plasma. Moreover, when the honeycomb structural body 11 is made of a material having photocatalysis, harmful substances are treated by decomposition and/or oxidation by active oxygen produced by the excitation with ultraviolet emitted from the discharge plasma. In this manner, the generation of the turbulent flow is advantageous.

In all the embodiments explained thus far, the waste gas flows through the through holes formed in the honeycomb structural body and the discharge plasma is generated along the through holes. According to the present invention, however, when photocatalysis is utilized, it is not always necessary to use a honeycomb structural body. Now such an embodiment will be explained.

Figure 27:
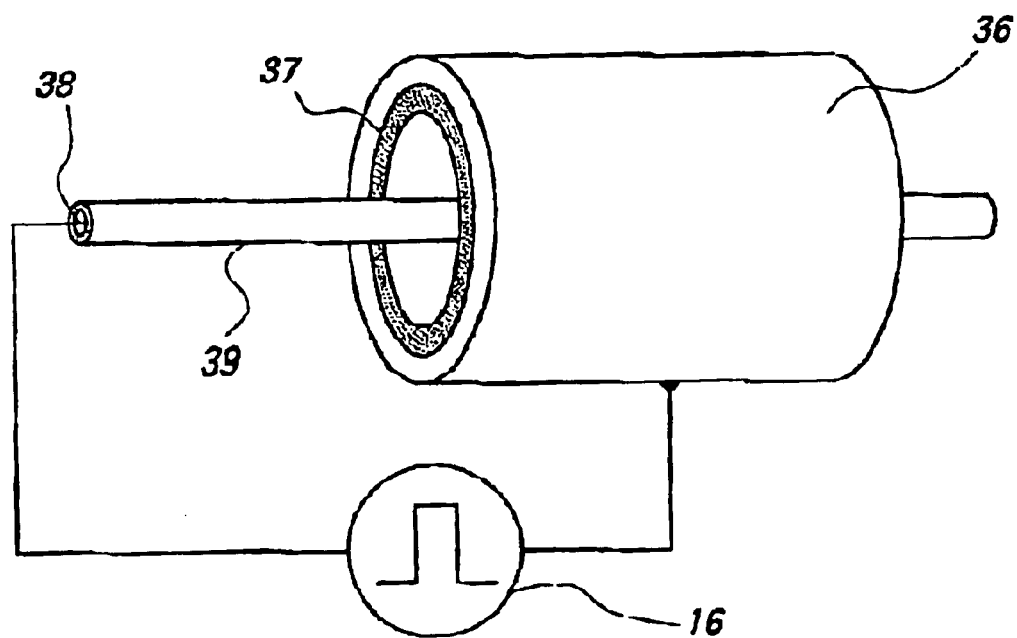
FIG. 27 is a perspective view showing a fourteenth embodiment of the substance treating apparatus according to the present invention, in which a honeycomb structural body is not used.

FIG. 27 is a perspective view schematically showing a fourteenth embodiment of the substance treating apparatus according to the present invention. In the present embodiment, on an inner wall of a metal sleeve electrode 36, there is arranged a first insulating sleeve 37 made of ceramics including a material having photocatalysis. The first insulating sleeve 37 defines a passage for a waste gas flow. Along a center of the first insulating sleeve 37, there is further arranged a wire electrode 38 having a second insulating sleeve 39 applied thereon, the second insulating sleeve being made of ceramics including a material having photocatalysis. The outer sleeve electrode 36 and wire electrode 37 are connected to a pulse supply source 16, and pulse corona discharge plasma is generated between the sleeve electrode 37 and the wire electrode 38.

Also in the present embodiment, the harmful substances contained in a waste gas are decomposed by a reaction with accelerated electrons and radicals generated by the discharge plasma between the sleeve electrode 36 and the wire electrode 38, and at the same time, the harmful substances are decomposed and/or oxidized by active oxygen produced by the first and second insulating sleeves 37 and 39 that are excited with ultraviolet radiation generated by the discharge plasma. In this manner, the harmful substances can be treated efficiently.

Figure 28:
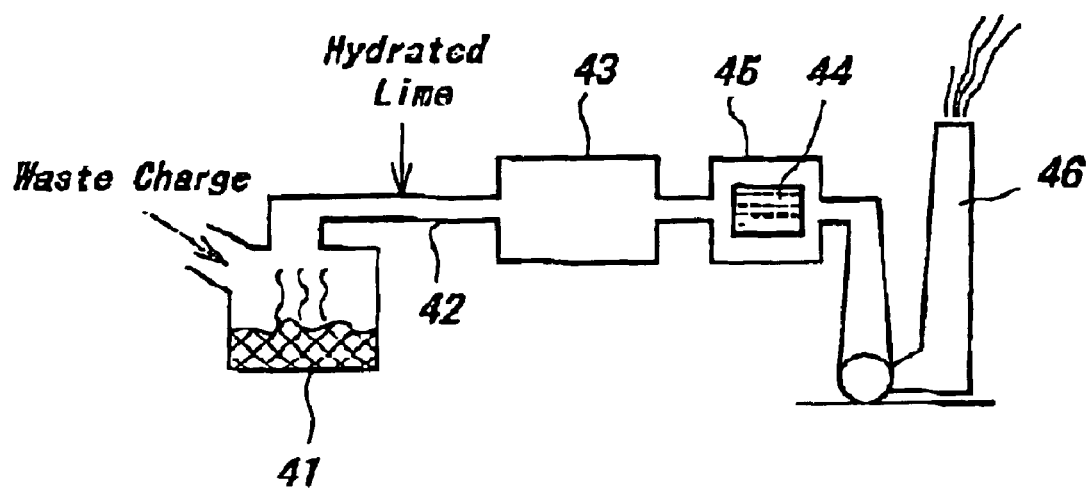
FIG. 28 is a schematic view representing a waste burning plant using the substance treating apparatus according to the present invention.

FIG. 28 is a schematic view showing a waste burning plant having the substance treating apparatus according to the present invention. An amount of collected waste is burnt by a burning furnace 41 and the waste gas from the furnace is conducted to a dust collecting chamber 43 through a duct 42. During the transportation through the duct 42, hydrated lime is added to the waste gas. In the dust collecting chamber 43, particles contained in the waste gas are collected. Then, the waste gas is guided into a harmful substance removing chamber 45 having the substance treating apparatus 44 according to the present invention. In the harmful substance removing chamber 45, as the waste gas flows through the through holes in the honeycomb structural body, harmful substances in the waste gas such dioxins, $SO_x$ and $NO_x$ are effectively decomposed by the reaction with the discharge plasma. Since the discharging electrodes are made of a metal having catalysis and/or the honeycomb structural body is made of a material having photocatalysis, harmful substances can be processed with a very high treating efficiency. Finally, a harmless waste gas is discharged from the harmful substance removing chamber 44 via a smokestack 46.

It should be noted that the present invention is not limited to the embodiments explained above, but many alternations and modifications may be conceived by a person skilled in the art within the scope of the invention. For instance, in the above embodiments, the substance treating technology according to the present invention is applied to city type incinerators and waste burning plants. However, the substance treating techniques according to the present invention may be equally applied to other applications. For instance, the present invention may be applied to deposition of silicon by decomposition of silane. Furthermore, the present invention may be applied to treat chlorofluorocarbon and trichloroethylene.

As explained above in detail, according to the present invention, since the discharge plasma is generated within the through holes formed in the honeycomb structural body, the discharge plasma can be generated uniformly over the whole honeycomb structural body. Therefore, by flowing a gas containing substances to be treated through the through holes, the substances can be effectively decomposed or transformed into easily collectable substances by a reaction with the electrons generated by the discharge plasma. In this manner, the given substances can be treated efficiently. Moreover, when the discharging electrodes are made of a metal having catalysis, the substances can be easily decomposed, and when the honeycomb structural body is made of a material having photocatalysis, substances can be decomposed and/or oxidized by active oxygen generated by the photocatalysis material excited with ultraviolet emitted from the discharge plasma. Then, the treating efficiency can be further improved.

When a pulse supply source is used for generating the discharge plasma, electrons having sufficiently high energy for decomposing dioxins can be generated with an extraordinary high density, and dioxins can be efficiently converted into harmless substances. Therefore, the substance treating technique according to the present invention is particularly preferable to be applied to city type incinerators and large scale industrial waste treating plants.

When use is made of a pulse supply source having a static induction thyristor as a switching element, a small size, low power consumption, semi-permanent life time, easy maintenance, a low initial cost and a low running cost can be attained.

Moreover, in the embodiments in which the discharging voltage is applied in a direction parallel to a longitudinal direction of through holes formed in a honeycomb structural body, since a large discharge region can be obtained by the surface discharge along inner walls of through holes, the reaction of substances to be treated with electrons generated by the discharge plasma is enhanced to increase a treating efficiency.

Further, the substance treating apparatus according to the present invention may applied to existing waste treating plants, firepower generating stations, blast furnaces and so on, and the present invention can provide a solution for environmental problems and can be used in various applications.

What is claimed is:

1. A method of treating substances comprising the steps of:
    providing an electrically insulating honeycomb structural body having a plurality of through holes formed therein;
    providing a plurality of electrodes, wherein at least a portion of said electrodes comprises a material having catalysis;
    generating a pulse corona discharge plasma substantially uniformly within the entirety of said honeycomb structural body along or across a longitudinal direction of said through holes by applying a discharge voltage across said electrodes;
    providing a fluid containing substances to be treated and introducing said fluid into said through holes of said honeycomb structural body; and
    treating said substances of said fluid by a reaction with said pulse corona discharge plasma and by catalysis of at least a part of said electrodes.

2. A method according to claim 1, wherein said pulse corona discharge plasma is generated within the honeycomb structural body such that electrons are produced that have a sufficiently high energy to effectively decompose dioxins.

3. The method according to claim 2, wherein said electrons have an energy of 3–10 eV.

4. The method according to claim 3, wherein said pulse corona discharge plasma is generated by a pulse supply source that produces a pulse current having a raising edge of not less than $5 \times 10^{10}$ amperes per second.

5. The method according to claim 4, wherein said pulse supply source comprises a static induction thyristor switching element.

6. The method according to claim 3, wherein said pulse corona discharge plasma is generated by a pulse supply source that produces a pulse current having a raising edge of not less than $1 \times 10^{11}$ amperes per second.

7. A method according to claim 1, wherein said pulse corona discharge plasma is generated within said honeycomb structural body in a direction parallel to said longitudinal direction of said through holes.

8. The method according to claim 7, further comprising the steps of:
    providing a first electrode on a first end surface of said honeycomb structural body;
    providing a second electrode on a second end surface of said honeycomb structural body; and
    applying a pulse supply voltage across said first electrode and said second electrode to generate said pulse corona discharge plasma.

9. A method according to claim 1, wherein said pulse corona discharge plasma is generated within said honeycomb structural body in a direction perpendicular to said longitudinal direction of said through holes.

10. The method according to claim 9, further comprising the steps of:

providing a first electrode on said honeycomb structural body;

providing a plurality of wire electrodes in a plurality of said through holes of said honeycomb structural body; and applying a pulse supply voltage across said first electrode and said wire electrodes to generate said pulse corona discharge plasma.

11. The method according to claim 9, further comprising the steps of:

providing a plurality of first wire electrodes in a first plurality of said through holes of said honeycomb structural body;

providing a plurality of second wire electrodes in a second plurality of said through holes of said honeycomb structural body; and applying a pulse supply voltage across said first wire electrodes and said second wire electrodes to generate said pulse corona discharge plasma.

* * * * *